(12) United States Patent
Kato

(10) Patent No.: US 6,798,906 B1
(45) Date of Patent: Sep. 28, 2004

(54) IMAGE PROCESSING APPARATUS AND METHOD INCLUDING LINE SEGMENT DATA EXTRACTION

(75) Inventor: Masahiro Kato, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 653 days.

(21) Appl. No.: 09/593,030

(22) Filed: Jun. 13, 2000

(30) Foreign Application Priority Data

Jun. 14, 1999 (JP) ............................................ 11-166676
Oct. 27, 1999 (JP) ............................................ 11-304923

(51) Int. Cl.[7] ............................ G06K 9/34; G06K 9/46
(52) U.S. Cl. ........................ 382/176; 382/177; 382/199; 382/202; 382/203; 358/1.11; 345/468; 345/469.1
(58) Field of Search ................................ 382/177, 176, 382/173, 198, 202, 185, 199, 203, 258; 358/1.11; 345/947, 468, 469.1

(56) References Cited

U.S. PATENT DOCUMENTS

| | | | | |
|---|---|---|---|---|
| 5,033,097 A | * | 7/1991 | Nakamura | 382/174 |
| 5,054,099 A | * | 10/1991 | Wakabayashi et al. | 382/298 |
| 5,644,366 A | * | 7/1997 | Ushida et al. | 348/625 |
| 5,818,978 A | * | 10/1998 | Al-Hussein | 382/296 |
| 5,832,141 A | * | 11/1998 | Ishida et al. | 382/298 |
| 5,867,277 A | * | 2/1999 | Melen et al. | 358/296 |
| 5,999,647 A | * | 12/1999 | Nakao et al. | 382/187 |
| 6,563,949 B1 | * | 5/2003 | Takebe | 382/190 |
| 6,614,930 B1 | * | 9/2003 | Agnihotri et al. | 382/176 |

FOREIGN PATENT DOCUMENTS

| | | |
|---|---|---|
| JP | 07-065123 | 3/1995 |
| JP | 09-269970 | 10/1997 |

OTHER PUBLICATIONS

English Abstract and Machine Translation of JP 07037035 A, Feb. 7, 1995.*

* cited by examiner

Primary Examiner—Bhavesh M. Mehta
Assistant Examiner—Christopher Sukhaphadhana
(74) Attorney, Agent, or Firm—Morgan Lewis & Bockius LLP

(57) ABSTRACT

The present invention provides an image processing apparatus and method that enables extraction of line segments of an arbitrary width from multi-valued images not uniform in background. To extract line segment data constituting a line segment, image data is scanned using a line segment basic element to extract line segment data from the image data. In other words, pixel data included in the line segment basic element is used as one unit and it is judged for each unit whether the pixel data corresponds to line segment data. Thereby, even if the densities of pixel data corresponding to, e.g., backgrounds are not uniform, by judging the line segment basic element as one unit, line segment data of a line segment width to be extracted can be extracted free of the influence of the densities being not uniform.

48 Claims, 24 Drawing Sheets

FIG.6

|   | 1 | 1 | 1 |   |
|---|---|---|---|---|
| 3 |   |   |   | 4 |
| 3 |   | 0 |   | 4 |
| 3 |   |   |   | 4 |
|   | 2 | 2 | 2 |   |

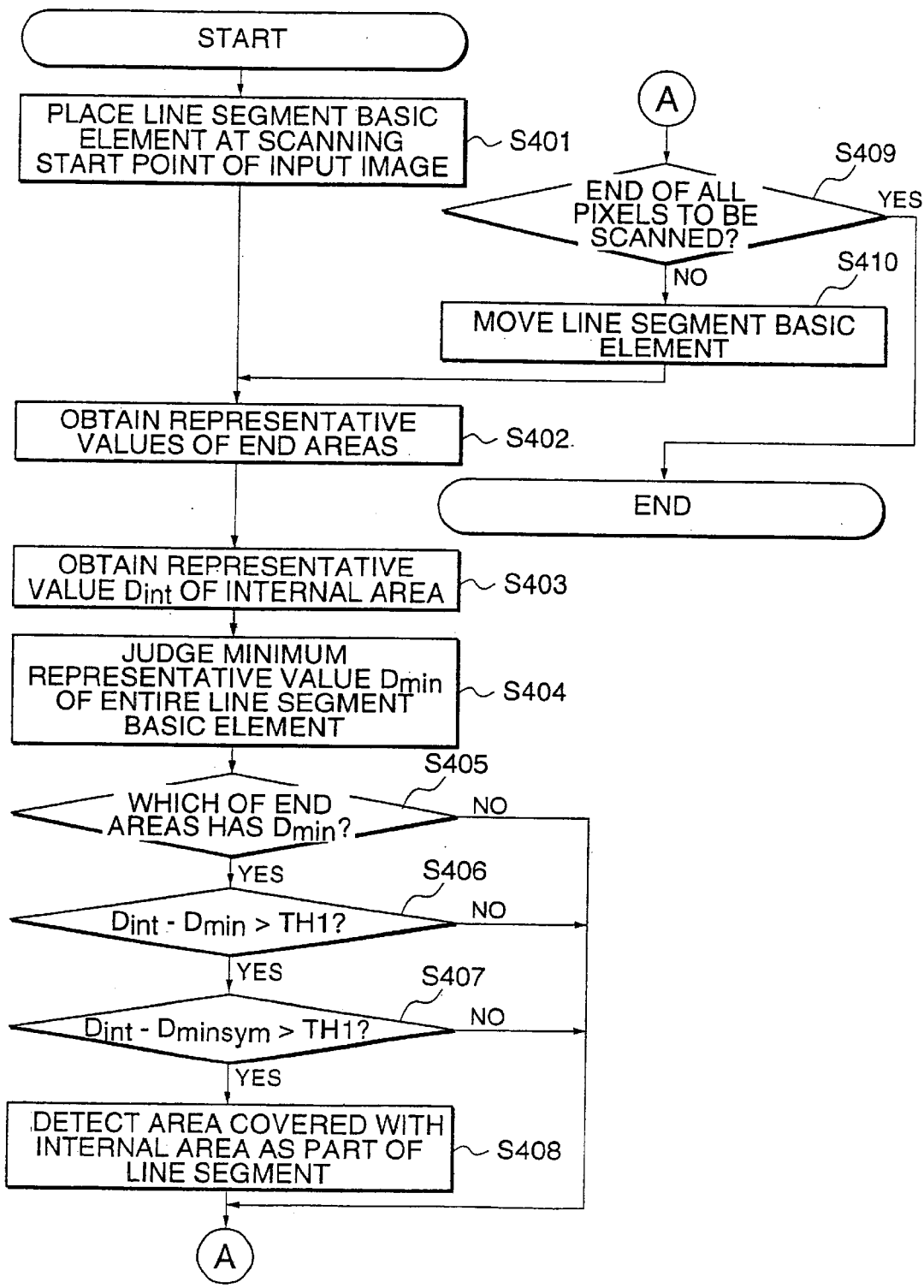

LINE SEGMENT
(DENSITY VALUES
200 TO 220)

AREA OTHER THAN
LINE SEGMENT
(DENSITY VALUES
50 TO 100)

AREA OBTAINED BY
EXPANSION PROCESSING

DENSITY VALUE REFERENCE RANGE DURING BINARIZATION

LINE SEGMENT CANDIDATE AREA

TARGET PIXEL

LINE SEGMENT OF OTHER THAN
EXTRACTION LINE WIDTH

EXTRACTED LINE SEGMENT

REFERENCE PIXELS HAVING DENSITY
VALUE CLOSE TO REPRESENTATIVE
DENSITY VALUE OF LINE SEGMENT

DENSITY REFERENCE AREA
OF CIRCUMFERENTIAL PIXELS

CIRCUMFERENTIAL PIXELS OF TARGET AREA
TARGET AREA

FIG.16A

THIS IS A TEXT WRITTEN AGAINST A LOW-DENSITY BACKGROUND.
THIS IS A TEXT CONTAINING REVERSED CHARACTERS WRITTEN AGAINST A LOW-DENSITY BACKGROUND.
THIS IS A TEXT WRITTEN AGAINST A HIGH-DENSITY BACKGROUND.
THIS IS A TEXT CONTAINING REVERSED CHARACTERS WRITTEN AGAINST A HIGH-DENSITY BACKGROUND.

FIG.16B

THIS IS A TEXT WRITTEN AGAINST A LOW-DENSITY BACKGROUND.
THIS IS A TEXT CONTAINING REVERSED CHARACTERS WRITTEN AGAINST A LOW-DENSITY BACKGROUND.
THIS IS A TEXT WRITTEN AGAINST A HIGH-DENSITY BACKGROUND.
THIS IS A TEXT CONTAINING REVERSED CHARACTERS WRITTEN AGAINST A HIGH-DENSITY BACKGROUND.

FIG.25A

THIS IS A TEXT WRITTEN AGAINST A LOW-DENSITY BACKGROUND.
THIS IS A TEXT CONTAINING REVERSED CHARACTERS WRITTEN AGAINST A LOW-DENSITY BACKGROUND.
THIS IS A TEXT WRITTEN AGAINST A HIGH-DENSITY BACKGROUND.
THIS IS A TEXT CONTAINING REVERSED CHARACTERS WRITTEN AGAINST A HIGH-DENSITY BACKGROUND.

EXCLUDED
EXCLUDED

FIG.25B

THIS IS A TEXT WRITTEN AGAINST A LOW-DENSITY BACKGROUND.
THIS IS A TEXT CONTAINING ▪ ▸ ▴ ▪ WRITTEN AGAINST A LOW-DENSITY BACKGROUND.
▴ ▴ ▴ ▴ ▴ ▪ ▪ ▪ ▴ ▴
▪ ● ▪▴ REVERSED CHARACTERS ▪ ▪ ▴
▴

IMAGE PROCESSING APPARATUS AND METHOD INCLUDING LINE SEGMENT DATA EXTRACTION

BACKGROUND OF THE INVENTION

1. Field of the Invention

The present invention relates to an image processing apparatus or method that extracts pixel data constituting line segments from acquired image data.

2. Description of the Prior Art

In recent years, there is a rapid development in network environments surrounding offices and homes as typified by the Internet and Intranet, along with widespread use of electronic document creation apparatuses such as word processors and personal computers (hereinafter simply referred to as PCs), which output electronic data, so that documents converted to electronic data are widely used for creation, transmission, and storage of information. On the other hand, there is increasing demand to use information of so-called hard documents such as long-familiarized paper prints which are in contrast with electronic documents. Mixed use of the hard documents and documents created by the electronic document creation apparatuses requires conversion of information of the hard documents to electronic data by some method.

The most basic method for achieving this is to use raster image data itself to which a hard document is captured as a digital image, as desired electronic data. However, in this case, the entire document is uniformly represented as a mere collection of pixels for any components of the document, such as text, pictures, graphics, and tables. Therefore, it is difficult to use such electronic data in a wide range such as free retrieval and editing of text, graphics and the like within the document, like documents created by the electronic text creation apparatuses.

To solve this problem, there is conventionally proposed a technique by which an image on a hard document used as a manuscript is split to plural areas having significant attributes, such as picture areas, graphics areas, table areas, vertical writing text areas, and horizontal writing text areas so that desired areas are extracted for use. For example, in many PC-oriented printing type character recognition software products, in the name of layout recognition processing, an inputted manuscript image is split to text areas, table areas, graphics areas, and other areas so that, for text expressions, character recognition processing is performed taking columns into account, and for table areas, with "table" in mind, the structure of the table is analyzed, and ruled lines and characters are separated before performing character recognition processing.

Normal character recognition processing programs including PC-oriented printing type character recognition software products assume manuscript images having no background or uniform color backgrounds in character areas such as text fields of newspaper stories. Accordingly, there is a drawback that the above-described layout recognition processing and other well-known techniques are not applicable to multi-valued manuscript images not uniform in background because of existence of designs and the like.

To cope with such a drawback, in recent years, several techniques have been proposed which enable character recognition processing to be performed for multi-valued manuscript images also. There is disclosed in, e.g., Japanese Published Unexamined Patent Application No. Hei 7-65123, a technique which binarizes a manuscript image having multi-valued density by deciding an optimum binarization threshold value for each of character areas extracted from the image, thereby making it possible to provide a high-quality binary image for document image processing. Specifically, after the entire image is binarized by a single threshold value, text areas are extracted from the binarized image, an optimized threshold value is calculated for each text area, and a relevant text area is binarized again with the optimized threshold value.

The above-described normal character recognition processing has the drawback that, even if a manuscript image has only binary densities, reversely qualified characters contained in the manuscript image, if any, cannot be extracted. On the other hand, there is disclosed in, e.g., Japanese Published Unexamined Patent Application No. Hei 9-269970, a technique which splits a manuscript image to areas having attributes such as character areas, picture areas, and graphics areas so that a black pixel rectangle area having a size not larger than a threshold value is extracted from rectangle areas of non-text areas, white pixel projection distributions are created in horizontal and vertical directions for the rectangle area concerned, and if character spacing can be recognized, the rectangle area concerned is judged as a reversed character area.

However, a problem as described below arises in the above-described conventional character recognition processing.

For example, with the prior art disclosed in Japanese Published Unexamined Patent Application No. Hei 7-65123, although character recognition processing can be performed for multi-valued manuscript images as well, since binarization is performed for the character recognition processing by deciding an optimized binarization threshold value for each of areas finally extracted as one text area, if the background densities of an area are not uniform within the area, such as when a gradation exists in the background of a text area, it will be difficult to extract all characters within the area while satisfactorily reproducing their shapes. Also, since a text area must be extracted from a binarized image, the range of occurrence of black pixels and white pixels varies depending on the setting of threshold values used for binarization processing, with the result that the range of a text area to be extracted may vary greatly. Furthermore, as characters to be extracted, only either of characters higher in density than circumferential pixels thereof as typified by black characters or characters lower in density than circumferential pixels thereof as typified by white characters are taken into account, so it is difficult to satisfactorily extract both at the same time from a manuscript image in which both coexist, for example, as is the case where a reversely qualified character exists.

Also, for example, with the prior art disclosed in Japanese Published Unexamined Patent Application No. Hei 9-269970, although reversely qualified characters, if any, can be extracted, as seen from the use of black pixel rectangle areas and white pixel projection distributions, since processing is performed on the assumption that an area to be extracted has already been binarized, the processing result will be highly dependent on the performance of binarization processing in conversion of a multi-valued image to a binary image.

Since these prior arts assume that a manuscript image is split to plural areas having significant attributes such as text areas, table areas, graphics areas and the like, to perform character recognition processing, for example, a part must be in advance provided which extracts only significant information such as characters and ruled lines.

SUMMARY OF THE INVENTION

The present invention has been made in view of the above circumstances and provides an image processing apparatus and method which, assuming that characters to be recognized have sets of line segments, extracts line segments such as characters and ruled lines having an arbitrary width from a manuscript image, thereby enabling satisfactory recognition of characters on not only binary images but also multi-valued images not uniform in background and yet providing for the existence of reversely qualified characters.

The present invention provides an image processing apparatus, which has: a data acquisition part that acquires image data having plural pieces of pixel data; a line segment extraction part that extracts, as line segment data, pixel data constituting line segments from the image data acquired by the data acquisition part; and a line width decision part that decides the line segment width of line segment data to be extracted by the line segment extraction part, wherein the line segment extraction part scans the image data by a line segment basic element that has a size accommodating to the line segment width decided by the line width decision part and corresponds to a predetermined graphic shape element, thereby extracting line segment data of the line segment width decided by the line width decision unit.

Furthermore, the present invention provides an image processing method which, after acquiring image data having plural pieces of pixel data, extracts, as line segment data, pixel data constituting a line segment of a given width from the image data, wherein the method includes the steps of: deciding the line segment width of line segment data to be extracted; scanning the image data by a line segment basic element that conforms to the decided line segment width and corresponds to a predetermined graphic shape element; and extracting line segment data of the line segment width from the image data by the scanning.

According to the image processing apparatus configured as described above or the image processing method having the above procedure, image data is scanned by a line segment basic element to extract line segment data from the image data. In other words, pixel data included in the line segment basic element is used as one unit and it is judged for each unit whether the pixel data corresponds to line segment data. Thereby, even if the densities of pixel data corresponding to, e.g., backgrounds are not uniform, by judging the line segment basic element as one unit, line segment data of a line segment width to be extracted can be extracted free of the influence of the densities being not uniform. Also, even if both line segment data higher in density than the circumference thereof and line segment data lower in density than circumference thereof are contained, likewise, by judging a line segment basic element as one unit, the line segment data can be correctly extracted. Accordingly, based on the extracted line segment data, characters, ruled lines and the like represented by sets of the line segment data can also be recognized.

The image processing apparatus of the present invention has: a data acquisition part that acquires image data having plural pieces of pixel data; a binarization part that binarizes the image data acquired by the data acquisition part to high-density components and low-density components; a connected component extraction unit that extracts both or either of high-density connected components and low-density connected components from the image data having been binarized by the binarization part, the high-density connected components each having high-density components successively arranged, and the low-density connected components each having low-density components successively arranged; a line segment extraction part that, of the connected components extracted by the connected component extraction part, excludes those judged as not constituting a character, and extracts the remaining connected components as line segment data; and a selection part that, as a result of extraction by the line segment extraction part, if both a high-density connected component and a low-density connected component are included in a predetermined target area, selects only either of them as a line segment data extraction result.

The image processing method of the present invention is an image processing method for extracting, after acquiring image data having plural pieces of pixel data, pixel data constituting a line segment from the image data as line segment data, including the steps of: binarizing the image data to high-density components and low-density components; extracting both or either of high-density connected components and low-density connected components from the binarized image data, the high-density connected components each having high-density components successively arranged, and the low-density connected components each having low-density components successively arranged; excluding, of the extracted connected components, those judged as not constituting a character, and extracting the remaining connected components as line segment data; and as a result of the extraction, if both a high-density connected component and a low-density connected component are included in a predetermined target area, selecting only either of them as a line segment data extraction result.

According to the image processing apparatus configured as described above or the image processing method having the above procedure, connected components are extracted from image data by binarizing the image data to high-density components and low-density components, and of the extracted connected components, only those judged as constituting characters are extracted as line segment data. If both a high-density connected component and a low-density connected component are included in a target area, only either of them is selected as a line segment data extraction result. For this reason, even if both line segment data higher in density than the circumference thereof and line segment data lower in density than the circumference thereof are contained, both of them can be correctly extracted. Accordingly, based on the extracted line segment data, characters, ruled lines, and the like represented by sets of the line segment data can also be recognized.

BRIEF DESCRIPTION OF THE DRAWINGS

Preferred embodiments of the present invention will be described in detail based on the followings, wherein:

FIG. 6 illustrates a concrete example of a line segment basic element formed by a line segment basic element formation unit of the line segment extraction unit shown in FIG. 4;

FIG. 7 is a flowchart showing an operation example of line segment detection processing by a line segment candidate extraction unit of the line segment extraction unit shown in FIG. 4;

FIG. 8D to FIG. 8E show line segments not detected;

FIG. 9A shows the state of pixels constituting a line segment, FIG. 9B shows the state of pixels detected as line segment data, and FIG. 9C shows the state of pixels constituting a line segment candidate area;

FIG. 10A shows the state of floating binarization, and FIG. 10B shows the state of pixels decided as line segment data;

FIG. 11A shows a connection with an area of other than extraction line width, and FIG. 11B shows a density reference state of circumferential pixels;

FIGS. 16A and 16B illustrate an example of image processing by the image processing apparatus shown in FIG. 1, FIG. 16A shows an image containing reversed characters to be processed, and FIG. 16B shows the result of processing the image;

FIGS. 25A and 25B illustrate an example of image processing by the image processing apparatus shown in FIG. 19, FIG. 25A shows an image containing reversed characters to be processed, and FIG. 25B shows black line segment data obtained by processing the image;

FIG. 26A shows an image containing reversed characters to be processed, and FIG. 26B shows white line segment data obtained by processing the image.

DESCRIPTION OF THE PREFERRED EMBODIMENTS

An image processing apparatus and method according to the present invention will be described hereinafter with reference to the drawings.

First Embodiment

Figure 1:
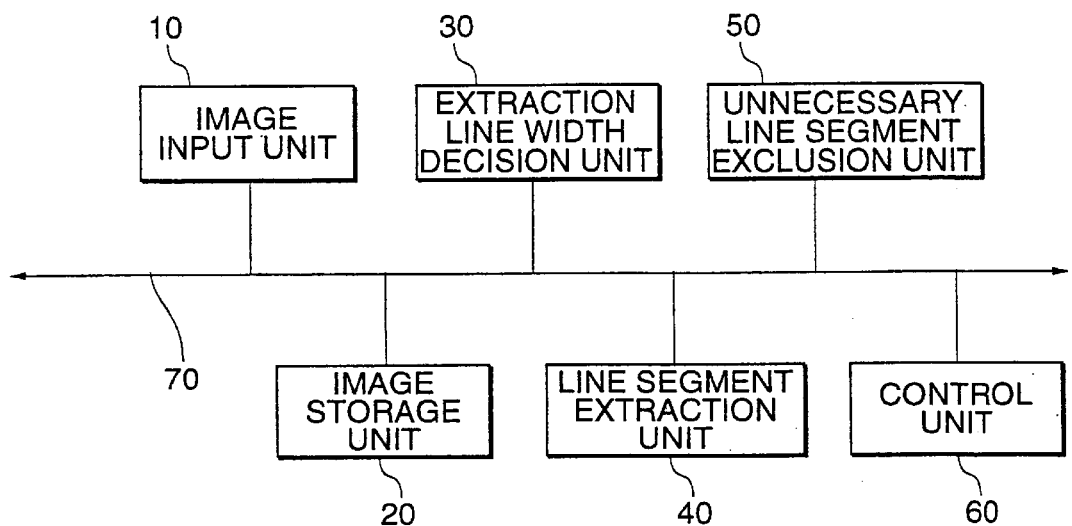
FIG. 1 is a block diagram showing an outline of the configuration of a first embodiment of an image processing apparatus according to the present invention.

FIG. 1 is a block diagram showing an outline of the configuration of a first embodiment of an image processing apparatus according to the present invention.

As shown in the drawing, the image processing apparatus of the present invention has: an image input unit 10; an image storage unit 20; an extracted line width decision unit 30; a line segment extraction unit 40; an unnecessary line segment exclusion unit 50; a control unit 60; and a bus 70 to connect the units.

The image input unit 10 acquires, from the outside of the image processing apparatus, the image data of a manuscript image from which to extract line segments. The image input unit 10 may be a part that optically inputs image data, such as a scanner, a digital camera, or a part that acquires image data through a storage medium on which digitized image data is prestored, or a network. It is to be noted that the image data to be acquired is digital data having plural pieces of pixel data.

The image storage unit 20 stores image data acquired by the image input unit 10. The image storage unit 20 may be an image memory provided specifically to store image data or a general-purpose storage device used to perform various operations, such as RAM (Random Access Memory) and hard disk.

The extraction line width decision unit 30 decides the width of line segments to be extracted from a manuscript image. For this reason, the extraction line width decision unit 30 has an extraction line width storage unit that prestores the width of line segments to be extracted, and an extraction line width specification unit that allows users to specify the width of line segments to be extracted (both not shown), and in accordance with users' directions, selects which of the line segment width stored in the extraction line width storage unit and a line segment width specified in the extraction line width specification unit is to be used, and decides one of the line segment widths as the width of line segments to be extracted.

The line segment extraction unit 40 extracts, from the image data acquired by the image input unit 10 and then stored in the image storage unit 20, pixel data constituting line segments of a width decided by the extraction line width decision unit 30 as line segment data.

The unnecessary line segment exclusion unit 50 excludes data decided to be unnecessary from the line segment data extracted in the line segment extraction unit 40.

Figure 27:
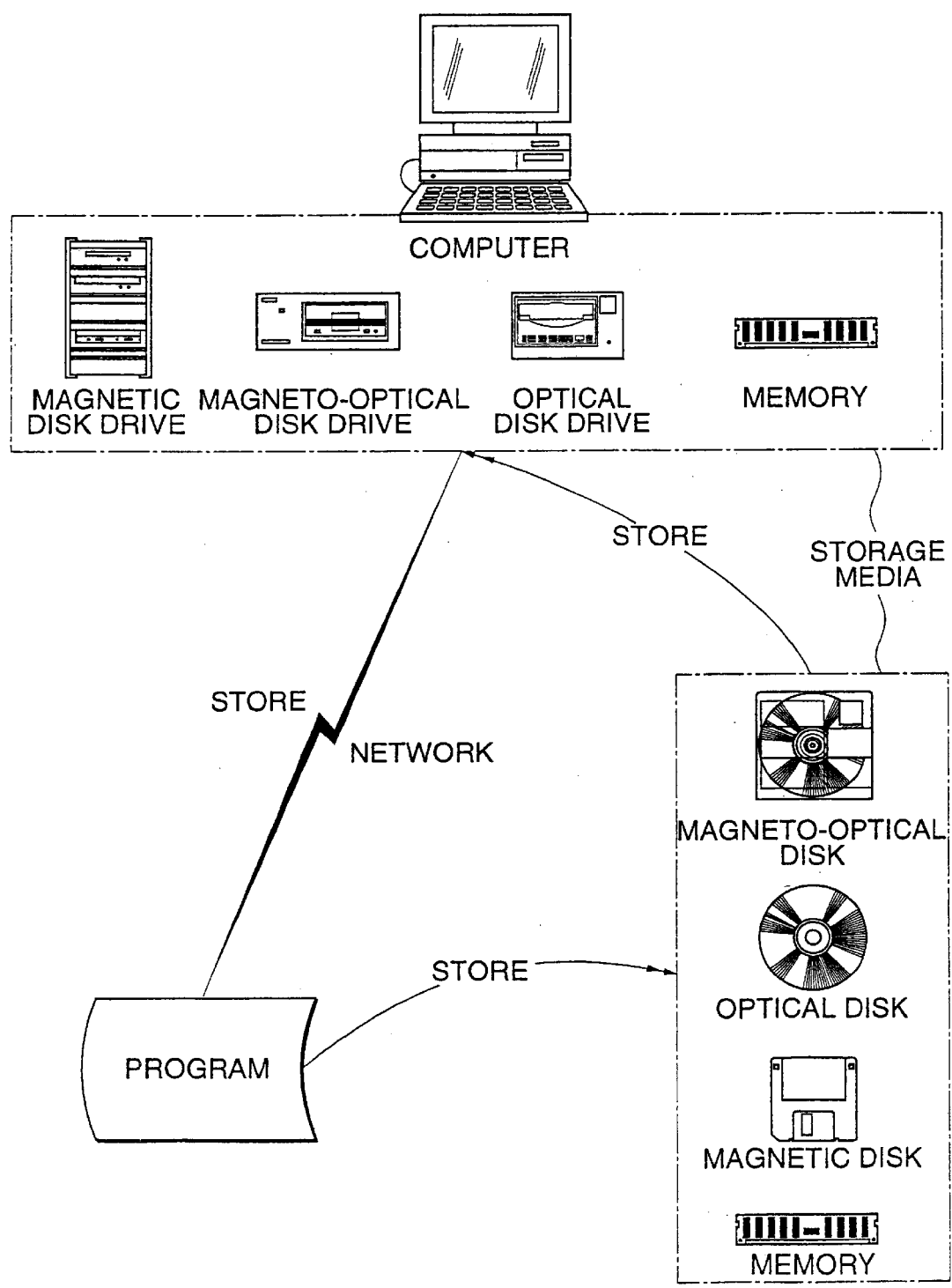
FIG. 27 shows an example of a storage medium storing an image processing program for line segment extraction according to the present invention.

The line segment extraction unit 40 and the unnecessary line segment exclusion unit 50 may be configured like software by, e.g., a microcomputer executing a required program as shown in FIG. 27, or like hardware by electronic circuits or the like having required functions.

The control unit 60 controls the above-described units, that is, the operation of the overall image processing apparatus of the present embodiment.

Figure 2:
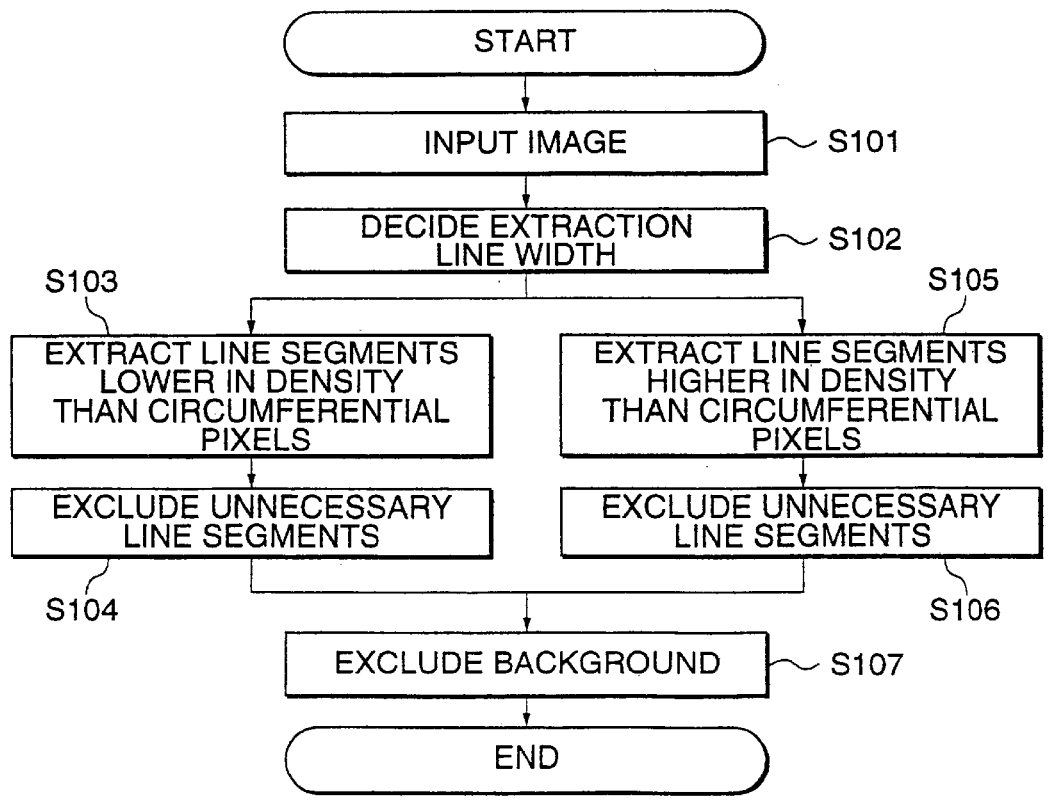
FIG. 2 is a flowchart showing an example of the processing operations of the overall image processing apparatus shown in FIG. 1.

Here, a brief description is made of the operation of the overall image processing apparatus configured as described above. FIG. 2 is a flowchart showing an outline of an example of the processing operations of the overall image processing apparatus of the present embodiment.

As shown in the drawing, in the image processing apparatus, when an image is inputted to the image input unit 10 (step 101, hereinafter steps will be simply referred to as S), image data acquired in the image input unit 10 is stored in the image storage unit 20 and the extraction line width decision unit 30 sets the width of line segments to be extracted (S102). At this time, the extraction line width decision unit 30 decides one of a prestored line segment width and a line segment width specified from the outside as the width of line segments to be extracted.

Upon completion of the setting of line segment width, next, in the image processing apparatus, the line segment extraction unit 40 extracts, from the image data stored in the image storage unit 20, line segment data (hereinafter referred to as low-density data) constituting line segments of the width decided by the extraction line width decision unit 30 that is lower in density than circumferential pixels thereof (S103). Furthermore, the unnecessary line segment exclusion unit 50 excludes data judged as unnecessary from the extracted low-density data (S104).

In the image processing apparatus, the line segment extraction unit 40 extracts, from the image data stored in the image storage unit 20, line segment data (hereinafter referred to as high-density data) constituting line segments of the width decided by the extraction line width decision unit 30 that is higher in density than circumferential pixels thereof (S105). Furthermore, the unnecessary line segment exclusion unit 50 excludes data judged as unnecessary from the extracted high-density data (S106).

The extraction of high-density data (S105) and the exclusion of unnecessary data (S106) may be performed in parallel with the extraction of low-density data (S103) and the exclusion of unnecessary data (S104), or they may be performed sequentially. Also, as will be described later, only one of them may be performed in accordance with specification from the outside.

Thereafter, in the image processing apparatus, the image storage unit 20 stores the result of extracting the low-density data from which unnecessary data has been excluded, and the result of extracting the high-density data from which unnecessary data has been excluded. However, if the line segments represented by the respective extraction results are adjacent to each other at a predetermined distance interval, the unnecessary line segment exclusion unit 50 judges that either of the line segment data corresponds to a background and excludes it (S107). The line segment data resulting from the exclusion process is used as the result of extracting the line segment data of the line segment width decided by the extraction line width decision unit 30.

After thus extracting the line segment data, the image processing apparatus uses the extracted line segment data as input data for performing character recognition processing or the like. That is, the image processing apparatus performs layout recognition processing, character recognition processing, or the like, based on the extracted line segment data used as input data to other processing functions of the image processing apparatus, e.g., the well-known layout recognition processing, character recognition processing, or the like.

Figure 3:
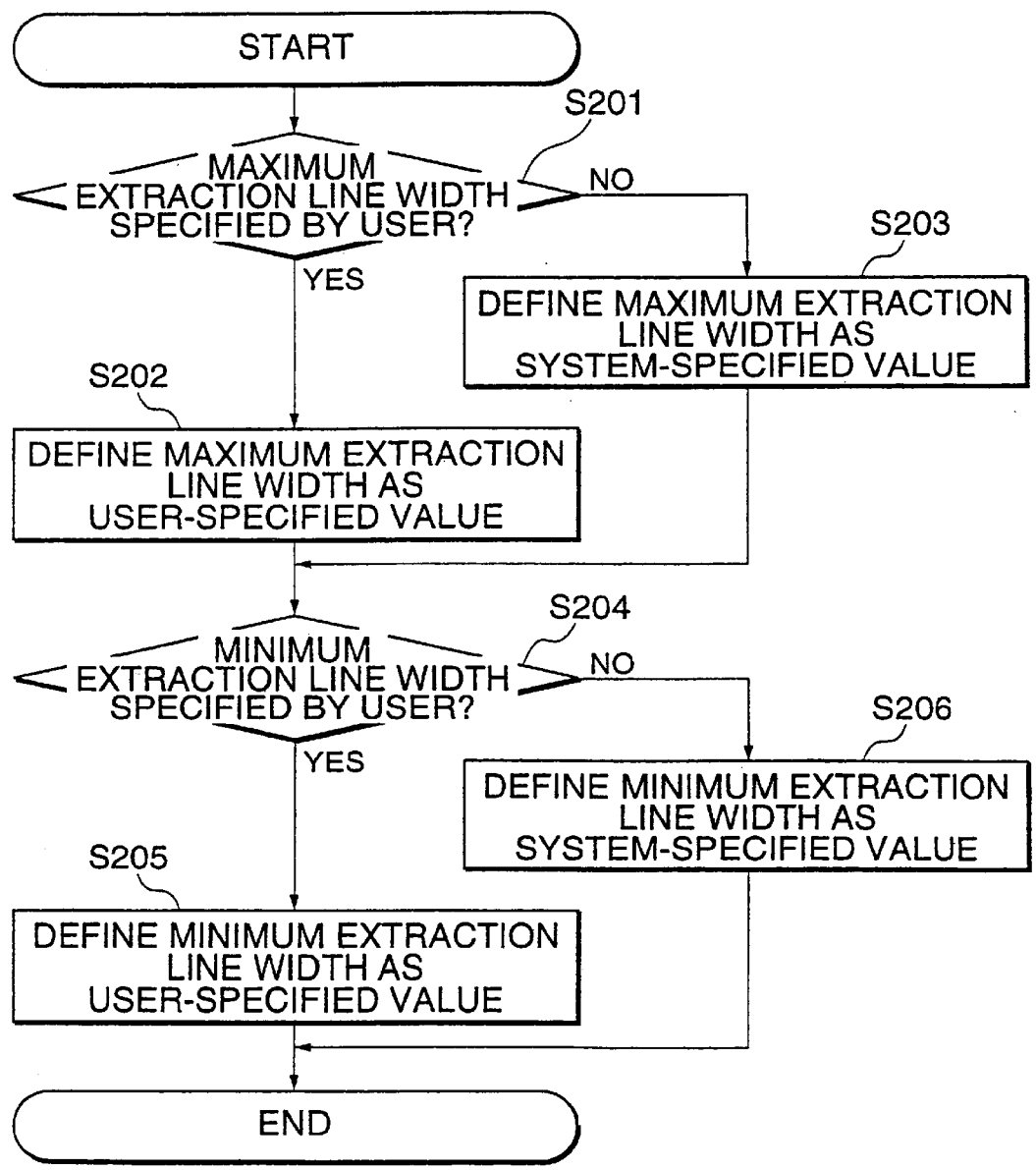
FIG. 3 is a flowchart showing an example of the processing operations of an extraction line width decision part in the image processing apparatus shown in FIG. 1.

Next, of the above-described processing operations, a processing operation (S102 in FIG. 2) performed by the extraction line width decision unit 30 is described in detail. FIG. 3 is a flowchart showing an outline of an example of the processing operations performed by the extraction line width decision unit 30.

As shown in the drawing, in setting the width of line segments to be extracted, the extraction line width decision unit 30 first judges whether a maximum extraction line width (maximum value) is specified by a user (S201). The judgment may be made based on whether specification is present in the extraction line width specification unit. If a maximum value is specified, the extraction line width decision unit 30 decides the maximum value of the width of line segments to be extracted, as a user-specified value (S202). If no maximum value is specified, it decides a system-specified value (default value) prestored in the extraction line width storage unit as the maximum value (S203).

Upon decision of the maximum value, the extraction line width decision unit 30 judges whether a minimum extraction line width (minimum value) is specified by the user (S204). The judgment may also be made based on whether specification is present in the extraction line width specification unit. If a minimum value is specified, the extraction line width decision unit 30 decides the minimum value of the width of line segments to be extracted, as a user-specified value (S205). If no minimum value is specified, it decides a system-specified value (default value) as the minimum value of line segments to be extracted (S206)

In this way, the extraction line width decision unit 30 decides the maximum and minimum values of the width of line segments to be extracted. These may be respectively different values or mutually identical values. That is, a line segment width decided by the extraction line width decision unit 30 may be in a range from one value to another or only a specific value. The extraction line width decision unit 30 passes the extraction result to the line segment extraction unit 40 as extraction line width information.

The extraction line width decision unit 30 may be further added with a function to judge whether a maximum extraction line width and a minimum extraction line width specified by a user fit within an extractable range in the line segment extraction unit 40.

Figure 4:
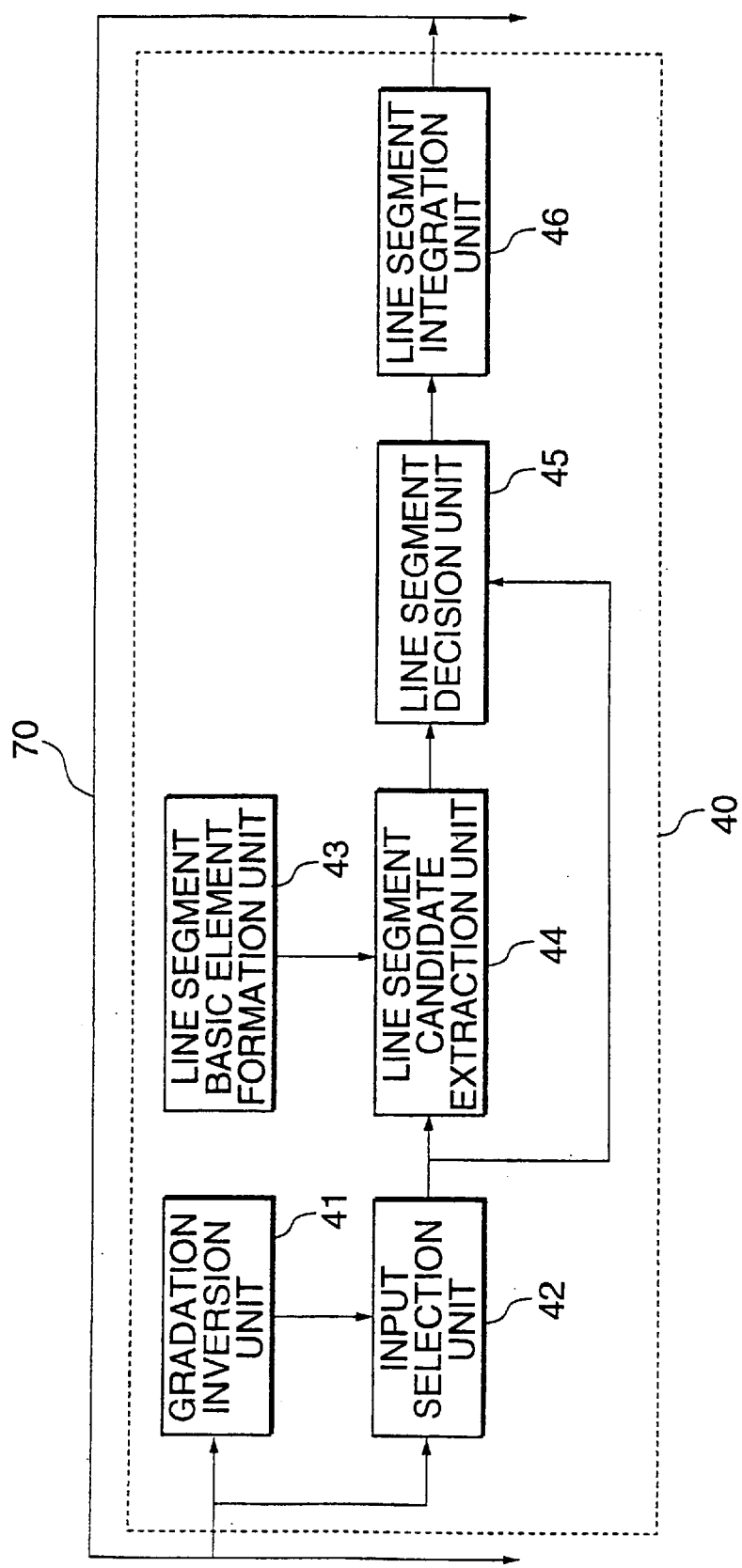
FIG. 4 is a block diagram showing an outline of the configuration of a line segment extraction unit in the image processing apparatus shown in FIG. 1.

Next, a detailed description is made of the line segment extraction unit 40 that extracts line segment data in accordance with the setting result in the extraction line width decision unit 30. First, a detailed configuration of the line segment extraction unit 40 is described. FIG. 4 is a block diagram showing an outline of the configuration of the line segment extraction unit 40.

As shown in the drawing, the line segment extraction unit 40 has: a gradation inversion unit 41; an input selection unit 42; a line segment basic element formation unit 43; a line segment candidate extraction unit 44; a line segment decision unit 45; and a line segment integration unit 46. Of these parts, the gradation inversion unit 41, the input selection unit 42, and the line segment integration unit 46 each are connected with the bus 70, which connects units within the image processing apparatus.

Upon receiving, via the bus 70, the image data stored in the image storage unit 20 after being acquired in the image input unit 10, the gradation inversion unit 41 inverts the density gradation of each piece of pixel data constituting the image data.

The input selection unit 42 selects, as input data to the line extraction unit 40, in accordance with directions from the control unit 60, either of the image data whose density gradation was inverted in the gradation inversion unit 41, and the image data (its density gradation is not inverted) unchangeably received from the image storage unit 20.

The line segment basic element formation unit 43 forms line segment basic elements necessary for extraction of line segment data. The line segment basic elements, as described later in detail, correspond to predetermined graphic shape elements, and their shape and size are decided by the line segment basic element formation unit 43, based on information about an extraction line width passed from the extraction line width decision unit 30.

The line segment candidate extraction unit 44 performs line segment detection processing, which will be described later in detail, for the image data selected as input data by the input selection unit 42, using the line segment basic elements formed in the line segment basic element formation unit 43, and performs line segment candidate extraction processing, which will be described later in detail, based on the processing result, thereby determining a line segment candidate area. The line segment candidate area refers to an area encompassing a line segment of the width of line segment to be extracted.

The line segment decision unit 45 binarizes pixel data included in the line segment candidate area determined by the line segment extraction unit 44, based on the density values of pixel data in its circumferential area and, from the pixel data included in the line segment candidate area, decides pixel data to be extracted as line segment data. The line segment decision unit 45 decides the range of the circumferential area during the binarization, based on information such as the size of the line segment basic elements formed in the line segment basic element formation unit 43.

The line segment candidate extraction unit 44 and the line segment decision unit 45, when the width of line segments to be extracted is specified with not one value but a range, performs extraction processing using line segment basic elements of two or more different sizes instead of using only line segment basic elements of one size. That is, in such a case, plural extraction results (corresponding to plural extracted images) are obtained corresponding to the number of line segment basic elements.

When the line segment candidate extraction unit 44 and the line segment decision unit 45 obtain plural extraction results, the line segment integration unit 46 integrates the extraction results as extracted line segment data, sends it to the image storage unit 20 via the bus 70, and stores it in the image storage unit 20. Specifically, the extraction results are integrated by creating a logical OR of the extraction results.

As the line segment data sent to the image storage unit 20 from the line segment integration unit 46, if both high-density data and low-density data are extracted as described previously, even after the line segment integration unit 46 performs integration, the high-density data and the low-density data exist individually, independently of each other.

Figure 5:
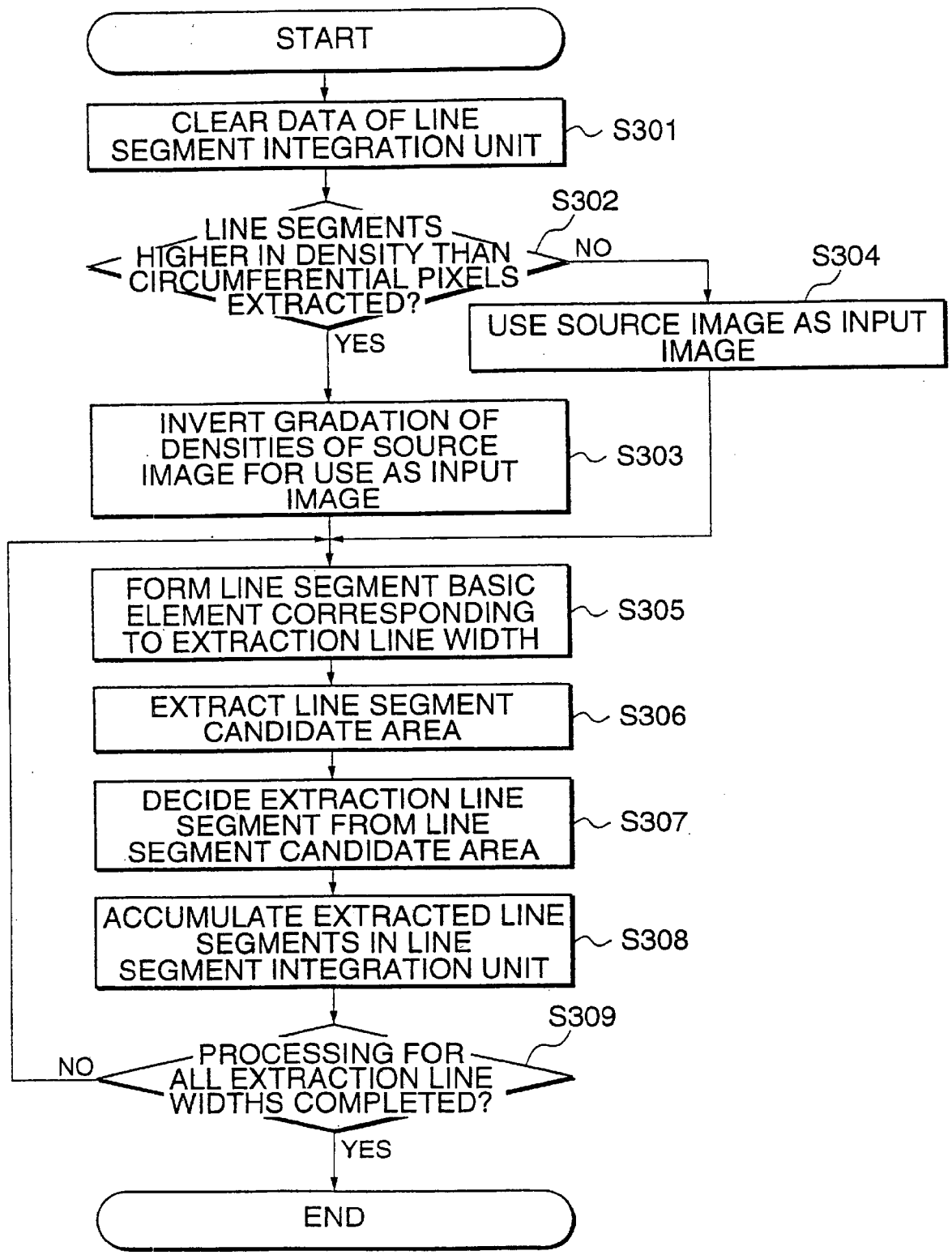
FIG. 5 is a flowchart showing an example of the processing operations of the overall line segment extraction unit shown in FIG. 4.

Next, the processing operations (S163 and S104 in FIG. 2) of the line segment extraction unit 40 configured as described above are described in detail. FIG. 5 is a flowchart showing an outline of an example of the processing operations of the overall line segment extraction unit 40.

As shown in the drawing, before extracting line segment data, the line segment extraction unit 40 clears data of the line segment integration unit 46 to avoid the influence of processing already terminated on subsequent processing (S301), and the input selection unit 42 judges whether to extract high-density data or low-density data in accordance with directions from the control unit 60 (S302).

If high-density data is extracted as a result of the judgment, the input selection unit 42 selects, as input data, image data acquired from the image storage unit 20 via the bus 70 and then inverted in density gradation by the gradation inversion unit 41 (S303) . On the other hand, if low-density data is extracted, the input selection unit 42 selects, as input data, without modification, image data acquired from the image storage unit 20 via the bus 70 (S304). Since the line segment extraction unit 40, in principle, performs processing on both input data if no specification is made from the outside, the order of processing on selected input data exerts no influence on the result of extracting the line segment data to be finally obtained.

Thereafter, in the line segment extraction unit 40, as details will be given later, the line segment basic element formation unit 43 forms line segment basic elements, based on the extraction line width information passed from the extraction line width decision unit 30 (S305). It is to be noted here that, for a wide range of extraction line widths, each time a line segment basic element of a different size is formed, processing of steps (S306 to S308) is performed. The line segment basic element formation unit 43 forms one line segment basic element of a different size in ascending order or descending order by size each time processing is performed (each time processing of S305 is invoked).

After the line segment basic element formation unit 43 has formed a line segment basic element, the line segment candidate extraction unit 44, as details will be given later, determines a line segment candidate area using the formed line segment basic element for the image data selected as input data by the input selection unit 42. That is, the input data is scanned by the line segment basic element, an area constituted of input data judged as "matching" the line segment basic element is judged as being part of a line segment (line segment detection processing), and an expansion of the detected area is determined as a line segment candidate area (line segment candidate extraction processing) The line segment candidate area thus determined will encompass the line segment to be extracted.

After the line segment candidate extraction unit 44 has determined a line segment candidate area, the line segment decision unit 45, as details will be given later, binarizes pixel data included in the determined line segment candidate area, and decides pixel data to be extracted as line segment data (S307) The line segment data thus decided corresponds to a binary image in which the only the line segment to be extracted exists.

Thereafter, the decided line segment data is stored in the image storage unit 20. At this time, if line segment data stored previously exists in the image storage unit 20, the line segment integration unit 46 finds a logical OR of the line segment data to be stored in the image storage unit 20 and the line segment data already stored, and stores the logical OR in the image storage unit 20 as integrated line segment data (S308).

Upon termination of storage to the image storage unit 20, the line segment extraction unit 40 compares the extraction line width information passed from the extraction line width decision unit 30 with the line width having already been subjected to line segment extraction processing; judges whether processing has terminated for all extraction line widths (S309); and if there is a line width for which extraction is not yet completed, goes again to the step (S305), where a line segment basic element is formed. At this time, where execution of processing following the step (S305) corresponds to n-th time, it is to be noted that a line segment basic element to be formed is different in size from any of the line segment basic elements having been formed in the (n−1)-time executions. As has been previously described, it is to be noted that line segment basic elements of different sizes are formed in ascending order or descending order by size. Upon completion of processing on all extraction line widths, the line segment extraction unit 40 terminates the line segment extraction processing.

Figure 6:
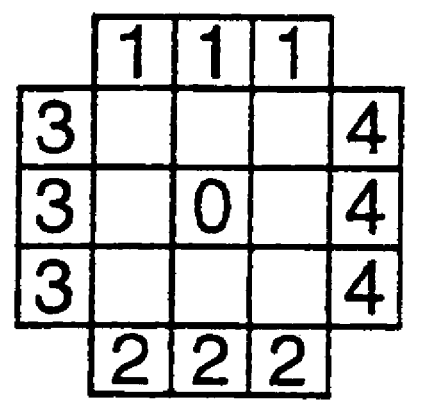

Next, of the line segment extraction processing by the line segment extraction unit 40, a detailed description is made of the formation (S305 in FIG. 5) of line segment basic elements by the line segment basic element formation unit 43. FIG. 6 illustrates a concrete example of a line segment basic element formed by the line segment basic element formation unit 43.

As shown in the drawing, a line segment basic element formed by the line segment basic element formation unit 43 having four end areas 1, 2, 3, and 4 of three by one pixels (or one by three pixels) each and an internal area of three by three pixels surrounded by the end areas. The shapes and sizes of the line segment basic elements are selected by the line segment basic element formation unit 43 in accordance with the line segment width set by the extraction line width decision unit 30. Therefore, the line segment basic element formation unit 43 prestores the correspondences between line segment data to be extracted and the shapes and sizes of line segment basic elements to be selected.

Next, of the line segment extraction processing by the line segment extraction unit 40, a detailed description is made of the determination of a line segment candidate area (S306 in FIG. 5) by the line segment candidate extraction unit 44.

The line segment candidate extraction unit 44 performs line segment detection processing and line segment extraction processing to determine a line segment candidate area.

Line segment detection processing is described in detail. FIG. 7 is a flowchart showing an outline of an operation example of the line segment detection processing. FIG. 8 illustrates concrete examples of detection states by the line segment detection processing.

The line segment detection processing is performed by scanning input data selected by the input selection unit 42, using the line segment basic element formed by the line segment basic element formation unit 43. Accordingly, the line segment candidate extraction unit 44, as shown in FIG. 7, places the line segment basic element at the point where the scanning of the input data is started (S401). Of pixel data included in the line segment basic element, for the pixel data included in end areas, density values thereof are obtained and the representative value of each end area is calculated from the obtained density values (S402). The representative value may be an average density value of pixel data included in each end area, or a minimum density value, a maximum density value, or a central value. It is to be noted here that a representative value is an average density value.

Upon calculation of the representative value of each end area, of the pixel data included in the line segment basic element, for the pixel data included in an internal area, density values thereof are obtained and the representative value $D_{int}$ of the internal area is calculated from the obtained density values (S403). Since there is one internal area, one representative value $D_{int}$ is obtained. The representative value $D_{int}$ may also be a minimum density value, a maximum density value, or a central value. It is to be noted here that the representative value $D_{int}$ is an average density value.

Accordingly, for example, where the line segment basic element as shown in FIG. 6 is used, the line segment candidate extraction unit 44 will obtain a total of five representative values for four end areas 1, 2, 3, and 4, and one internal area.

Upon acquisition of the representative values, the line segment candidate extraction unit 44 judges whether the pixel data included in the line segment basic element is a candidate for line segment data to be extracted, based on the representative values. This is done by judging whether the line segment basic element matches a target point on the image represented by the input data. That is, if the line segment basic element matches, pixels (pixel data) covered in an internal area of the line segment basic element are detected as a constituent of the line segment to be extracted.

This process will be described below with reference to FIG. 8. In FIG. 8, a line segment having pixel data having density values of 200 to 220 exists in a background area having density values 50 to 100, and scanning is performed on an image represented by the pixel data, using line segment basic elements. The following description concerns an example that the line segment candidate extraction unit 44 extracts high-density data in accordance with directions from the control unit 60.

Figure 8A:
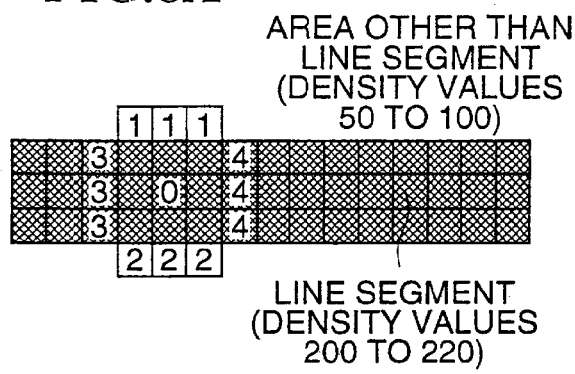
FIGS. 8A to 8E illustrate concrete examples of pixel states detected by the line segment detection processing shown in FIG. 7, FIG. 8A to FIG. 8C show detected line segments.

For example, it is assumed that a line segment basic element being scanned is placed in an image position as shown in FIG. 8A. Since end areas 1 and 2 are off a portion corresponding to a line segment, both the representative values of them are 50 to 100. On the other hand, since end areas 3 and 4, and an internal area are on the portion corresponding to the line segment, any of the representative values of them is 200 to 220.

When the representative values have been obtained in this way, the line segment candidate extraction unit 44 judges an area having the smallest representative value $D_{min}$ of the end areas 1 to 4 and the internal area surrounded by them (S404 in FIG. 7). The line segment candidate extraction unit 44 judges, from the judgement result, which of the end areas 1 to 4 has the smallest representative value $D_{min}$, (S405 in FIG. 7). In the example of FIG. 8A, it is found that either of the end areas 1 and 2 corresponds to such an area. Here, it is assumed that the end area 1 has the smallest representative value $D_{min}$ (=50).

After judging the smallest representative value $D_{min}$, the line segment candidate extraction unit 44 compares the representative value $D_{int}$ (=210) of the internal area with the smallest representative value $D_{min}$, that is, the representative value $D_{min}$ of the end area 1, and judges whether the difference is greater than a preset threshold value TH1 (S406 in FIG. 7). As a result of the judgement, for example, if a condition is satisfied that the threshold value TH1=50 and the difference between the representative value $D_{int}$ and the representative value $D_{min}$ is greater than or equal to the threshold value TH1, the line segment candidate extraction unit 44 refers to the end area 1 having the representative value $D_{min}$ and the representative value $D_{minsym}$ of the end area 2 in opposed relation to the end area 1 with respect to a reference point 0 of the internal area, and judges whether the difference between the representative values $D_{minsym}$ and $D_{int}$ is greater than the threshold value TH1 (S407 in FIG. 7). In the example of FIG. 8A, since the end area 2, like the end area 1, is off the portion corresponding to the line segment, it is assumed that a representative value $D_{minsym}$ is 70. In this case, since the threshold value TH1 is 50, the condition is satisfied that the representative value $D_{int}$ is the threshold value TH1 or more greater than the representative value $D_{minsym}$.

If the representative value $D_{int}$ is a value that is the threshold value TH1 or more greater than the representative value $D_{minsym}$, the line segment candidate extraction unit 44 judges that the line segment basic element matches the line segment, and estimates pixel data included in the internal area of the line segment basic element as part of the line segment to be finally extracted and detects it (S408 in FIG. 7). In other words, if the representative value $D_{int}$ of the internal area of the line segment basic element is the predetermined threshold value TH1 or more greater than the representative values of two end areas positioned symmetrically with respect to a reference point of the internal area, it is judged that the line segment basic element matches the line segment to be extracted.

Figure 8B:
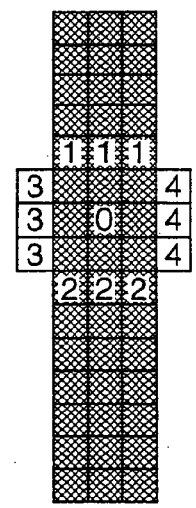
Figure 8C:
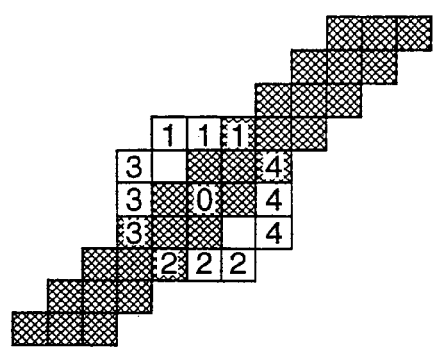

FIGS. 8B and 8C show examples that the line segment basic element is judged as matching line segments different in direction from the line segment of FIG. 8A. In FIG. 8B, two end areas symmetrical with a reference point 0 of the internal area are end areas 3 and 4, and in FIG. 8C, two end areas symmetrical with the reference point 0 of the internal area are one of combinations of end areas 1 and 2, and end areas 3 and 4.

Figure 8D:
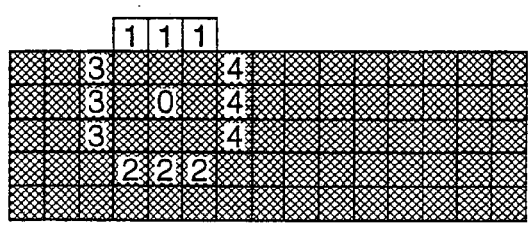
Figure 8E:
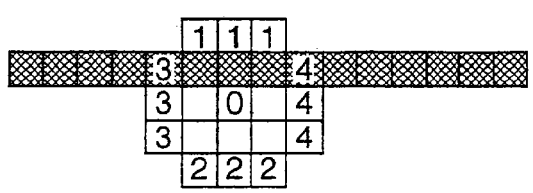

On the other hand, FIGS. 8D and 8E show examples of line segments having a thick line width and a thin line width that would not be detected (matched) by a line segment basic element of a shape and a size as shown in FIG. 6.

After pixel data' satisfying a specified condition has been thus detected by the line segment basic element, the line segment candidate extraction unit 44 judges whether the above-described scanning (S402 to S408) has terminated for all pixel data constituting the input data (S409). If there still remains pixel data to be scanned, after moving the line segment basic element (S411), the above-described steps are repeatedly performed again (S402 to S411).

As has been described above, the line segment detection processing in the line segment candidate extraction unit 44 depends upon the shape and size of a line segment basic element. Therefore, it goes without saying that, in addition to the line segment basic element shown in FIG. 6, line segment basic elements of other shapes (e.g., rectangle, circle, etc.) and sizes formed by the line segment basic element formation unit 43 can be used in the line segment detection processing.

In the above description, the method of using only one representative value of pixel data included in an internal area of a line segment basic element has been described. However, two or more representative values of the internal area may be used, in which case only areas more similar to line segments could be extracted.

For example, as one representative value, the average density value of pixel data included in an internal area of a line segment basic element might be used, and as another representative value, the variance of density values might be used. In addition to the judgement (S406, S407) by use of the threshold value TH1, a threshold value TH2 indicative of a permissible range on the variance of densities of the internal area is newly introduced, whereby, when another representative value is within the variance range defined by the threshold value TH2, it is judged that the line segment basic element matches a line segment. Thereby, a property can be provided so that even though it is judged by the judgment (S406, S407) by use of the threshold value TH1 that a thing like a line segment is detected, it is not detected as the line segment in an area where densities are remarkably different between adjacent pieces of pixel data, such as an area having net points.

In most of printed multi-valued document images, designs and pictures are represented in net points, while it is rare that characters in major texts and tables, and ruled lines are represented in net points. Accordingly, by adding the above-described judgement by use of the threshold value TH2, the characters in the major texts and characters and ruled lines in the tables can be extracted as line segments without extracting line segments from images represented in net points.

Next, a detailed description is made of line segment candidate extraction processing, a counterpart of the line segment detection processing in the line segment candidate extraction unit 44. FIG. 9 illustrates concrete examples of extractions by the line segment candidate extraction processing.

Figure 9A:
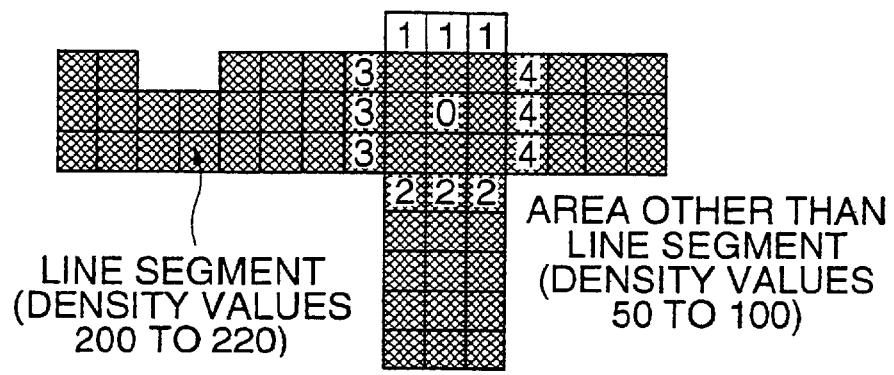
FIGS. 9A to 9C illustrate concrete examples of line segment data extraction by line segment candidate extraction processing in the line segment candidate extraction part of the line segment extraction part shown in FIG. 4.
Figure 9B:
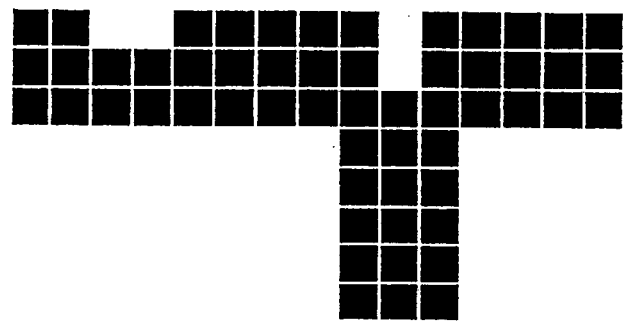

The line segment candidate extraction processing aims at expanding an area having the pixel data detected in the line segment detection processing. This is done for the reason described below. For example, as shown in FIG. 9A, when the input data contains pixel data constituting line segments intersecting in nearly T character shape, think of the case where the line segments are detected using the line segment basic element shown in FIG. 6. In this case, when the line segment basic element is in an intersection position of the nearly T character shape, an area having the smallest representative value $D_{min}$ in the line segment basic element is end area 1. However, as for end area 2 in opposed relation to the end area 1 with respect to a reference point 0 of the internal area, the difference between its representative value $D_{minsym}$ and the representative value $D_{int}$ of the internal area is less than the threshold value TH1. Consequently, when the line segment basic element is in the intersection position of the nearly T character shape, pixel data included in the internal area will not be detected in that position. In other words, if detection is performed using the line segment basic element shown in FIG. 6, pixel data that cannot be detected might remain in the vicinity of the intersection of the line segments, as shown in FIG. 9B.

Figure 9C:
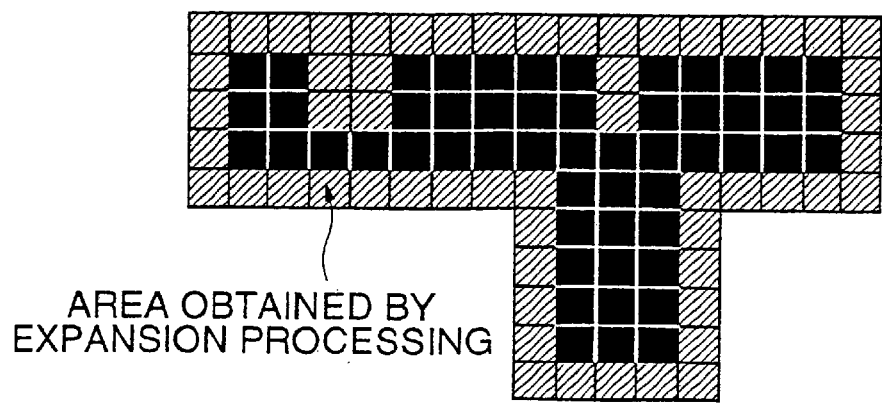

To avoid such a situation in which part of pixel data is not detected, the line segment candidate extraction unit 44 performs the line segment candidate extraction processing after termination of the line segment detection processing. In the line segment candidate extraction processing, for the result of detecting pixel data by the line segment detection processing, as shown in FIG. 9C, over the entire circumference of an area constituted by the detected pixel data, the area is expanded by a predetermined number of pixels (e.g., one pixel). An area having pixel data obtained by the expansion processing plus pixel data already detected is determined as a line segment candidate area.

A predetermined number of pixels for the expansion processing is set so that a line segment candidate area encompasses all pixel data to constitute the line segment data to be extracted. However, the number of pixels to be expanded in the expansion processing can be set to any value; for example, it may be decided according to the size of the line segment basic element used in the line segment detection processing.

As has been described above, the line segment candidate extraction unit 44 extracts a line segment candidate area encompassing a line segment having a line width decided by the extraction line width decision unit 30 from the input data by the line segment candidate extraction processing performed after the line segment detection processing. Although FIGS. 8 and 9 show examples that the input data is multi-valued image data, it goes without saying that a line segment candidate area can be extracted for binary input data in the same way as for multi-valued data.

Next, a detailed description is made of the decision (S307 in FIG. 5) of pixel data to be extracted as line segment data by the line segment decision unit 45. FIG. 10 illustrates a concrete example of line segment data decision to which floating binarization is applied.

The line segment decision unit 45 decides the line segment data to be extracted from the line segment candidate area extracted by the line segment candidate extraction unit 44. This is done as follows. All pieces of pixel data in the line segment candidate area are binarized with each piece of the pixel data as a target pixel, by referring to the density values of pixel data in its circumferential area, and the pixel data included in the area, obtained by the binarization, is decided as line segment data.

Figure 10A:
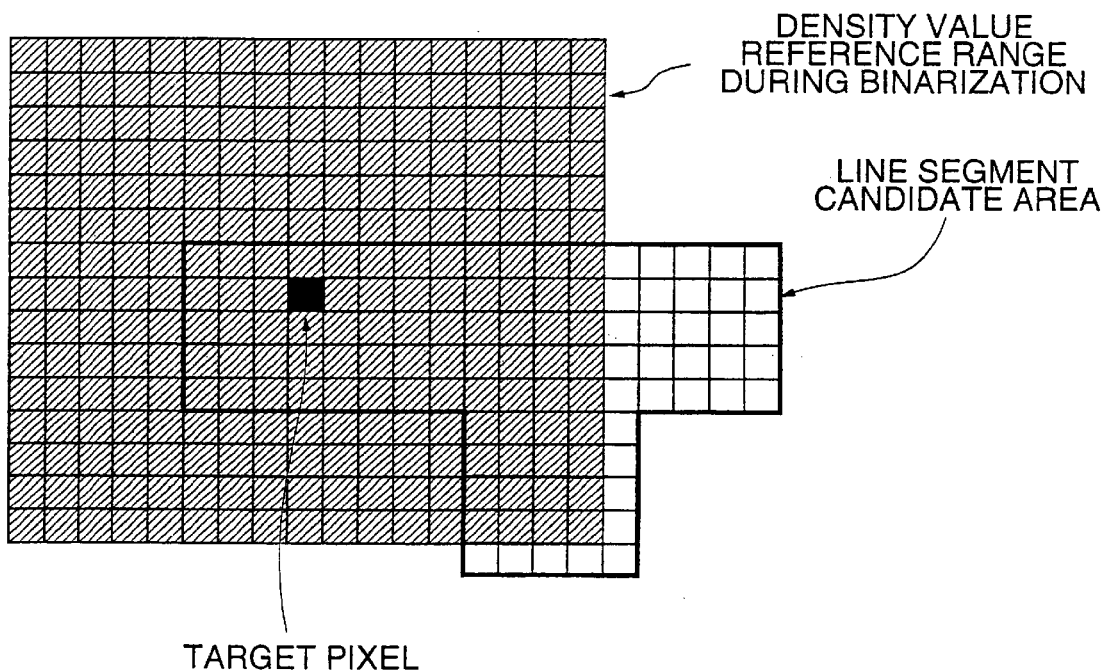
FIGS. 10A and 10B illustrate concrete examples of line segment data decision to which floating binarization is applied, by a line segment decision unit of the line segment extraction unit shown in FIG. 4.
Figure 10B:
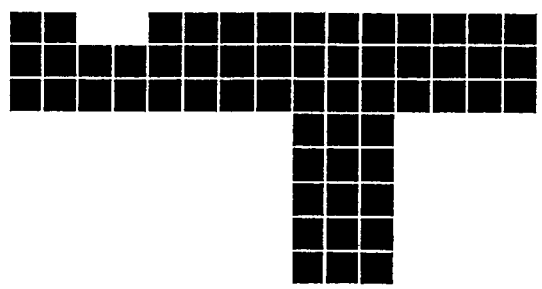

For example, as shown in FIG. 10A, think of the case where pixel data in a portion indicated in black in a line segment candidate area is used as a target pixel. In this case, the line segment decision unit 45 calculates the average density value of pixel data existing in a range of 15×15 pixels with the target pixel as center, judges whether the difference between the average density value and the density value of the target pixel is a preset threshold value TH3 or more, and performs binarization in a manner that outputs "1" if equal to or greater than the threshold value TH3 and "0" otherwise. The line segment decision unit 45 obtains an area as shown in FIG. 10B from the result of the floating binarization and decides pixel data included in the area as the line segment data to be extracted.

Here, although a description has been made of a method by which the line segment decision unit 45 decides line segment data using the floating binarization as shown in FIG. 10, the line segment decision unit 45 can decide line segment data without using the floating binarization. For example, the average value or central value of density values of pixel data included in a line segment candidate area is calculated, the calculation result is used as a representative density value of the line segment candidate area, and pixel data having density values within a predetermined range (±TH3') from the representative value be decided as part of the line segment data to be extracted.

Here, although a description has been made, using an example, of the case where the line segment candidate extraction unit 44 extracts high-density data in accordance with directions from the control unit 60, low-density data can also be extracted in the same way. In short, in extracting low-density data, since image data stored in the image storage unit 20 is used directly without inverting the density gradation of the image data, it is apparent that line segment data can be extracted in the same way as described above.

Next, a detailed description is made of the exclusion of unnecessary data from line segment data extracted by the line segment extraction unit 40 and the unnecessary part exclusion unit 50 which performs exclusion. Unnecessary data exclusion processing performed by the unnecessary part exclusion unit 50 includes line segment exclusion processing (S104 and S106 in FIG. 2) and background exclusion processing (S107 in FIG. 2).

First, the line segment exclusion processing is described in detail. FIG. 11 illustrates a concrete example of line segment exclusion by the line segment exclusion processing, and FIG. 12 is a flowchart showing an outline of an operation example of the line segment exclusion processing.

If the line segment data extracted by the line segment extraction unit 40 is connected with an area having a thicker line width or a thinner line width than the extraction line width decided by the extraction line width decision unit 30, the line segment exclusion processing excludes the line segment data from the line segment extraction result of the line segment extraction unit 40. It is to be noted here that line segment data connected with an area having a thicker line width than the extraction line width decided by the extraction line width decision unit 30 is excluded from the extraction result of the line segment extraction unit 40. The line segment exclusion processing may be omitted as required.

Figure 11A:
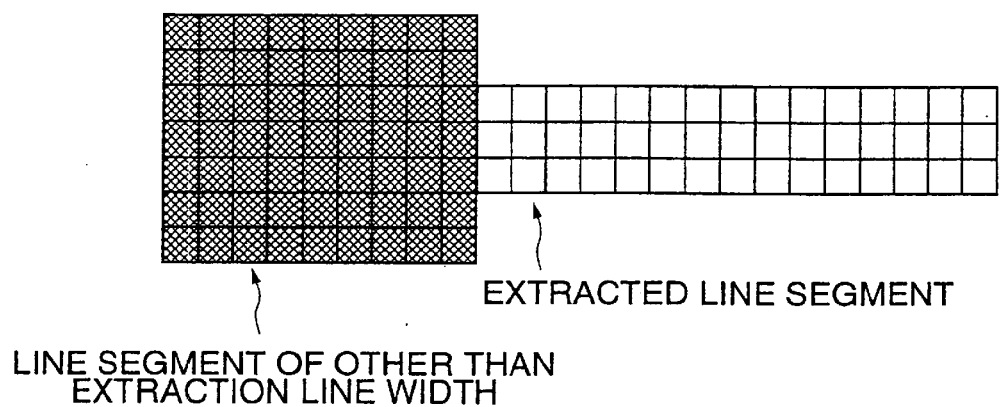
FIGS. 11A and 11B illustrate concrete examples of line segment exclusion processing by an unnecessary line segment exclusion unit in the image processing apparatus shown in FIG. 1.

For example, as shown FIG. 11A, think of the case where a line segment higher in density than the circumferential pixels to be extracted in the line segment extraction unit 40 connects with a line segment that is wider than the extraction line width decided by the extraction line width decision unit 30 and is higher in density than circumferential pixels thereof. In such a connection state, in some cases, the line segment data may be incorrectly detected and subsequent character recognition processing and other processing may be badly affected. Accordingly, on encountering such a connection state, the unnecessary line segment exclusion unit 50 judges line segment data creating the connection state as unnecessary data and excludes the line segment data from the line segment data extracted by the line segment extraction unit 40.

Figure 12:
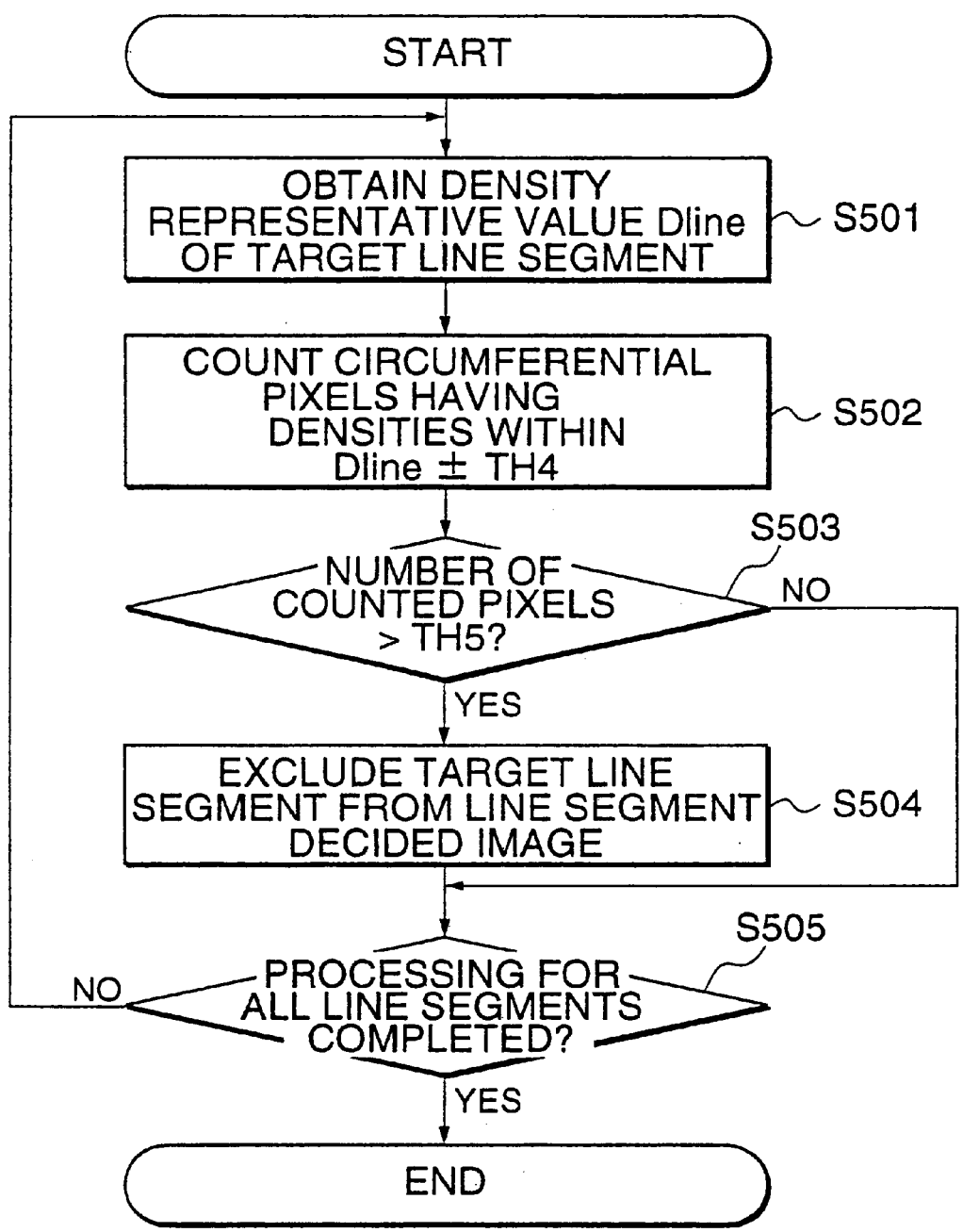
FIG. 12 is a flowchart showing an operation example of the line segment exclusion processing performed by the unnecessary line segment exclusion unit in the image processing apparatus shown in FIG. 1.

To do this, the unnecessary line segment exclusion unit 50, as shown in FIG. 12, obtains a representative value $D_{line}$ calculated from the density values of all line segment data constituting a line segment of a target line width, of the line segment data of different line widths extracted by the line segment extraction unit 40 (S501). Here, an average density value will be used as the representative value.

Figure 11B:
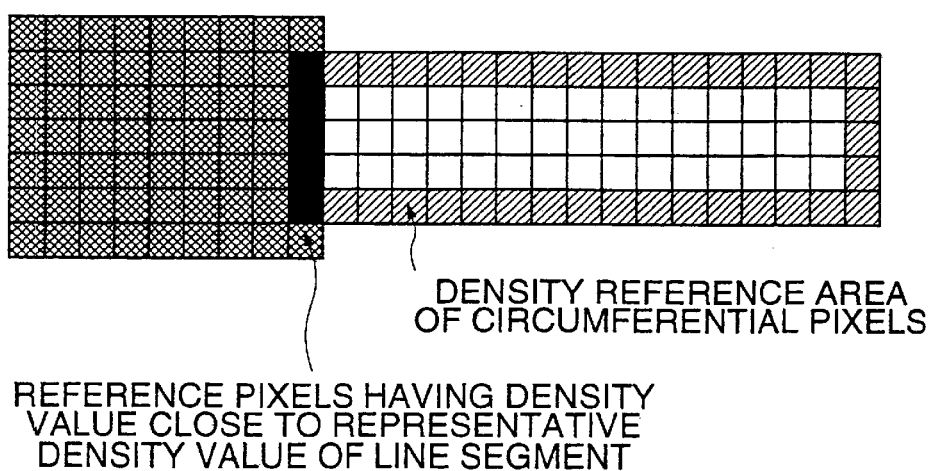

After obtaining the representative value $D_{line}$, the unnecessary line segment exclusion unit 50, as shown in FIG. 11B, refers to the density values of pixel data surrounding the circumference of the line segment and counts the density values that are within a preset threshold value (±TH4) from the representative value $D_{line}$ (S502 in FIG. 12). In the example shown in FIG. 11B, five pixel portions indicated in black correspond to pixels having density values within ±TH4.

The unnecessary line segment exclusion unit 50, as shown in FIG. 12, compares the counting result with a threshold value TH5 in advance set to correspond to a target line width and judges whether the number of counted pixel values exceeds the threshold value TH5 (S503). As a result of the judgement, if the number of counted pixels exceeds the threshold value TH5, the unnecessary line segment exclusion unit 50 judges that the line segment of the target line width connects with a line segment that is wider than the extraction line width decided by the extraction line width decision unit 30, and excludes line segment data constituting the line segment of the target line width from the line segment extraction result stored in the image storage unit 20 (S504).

For example, provided the threshold value TH5 is equal to 4, it is judged that the line segment shown in FIG. 11A connects with a line segment thicker than the extraction line width decided by the extraction line width decision unit 30 as shown in FIG. 11B, and pixel data constituting the line segment is excluded from high-density data extraction results, stored in the image storage unit 20.

Thereafter, the unnecessary line segment exclusion unit 50, as shown in FIG. 12, judges whether line segment data of a line width not yet regarded as a target exists in the high-density data extraction results stored in the image storage unit 20 (S505), and the line segment exclusion processing terminates upon termination of processing on line segment data of all line widths. Although an example of high-density data has been described here, it goes without saying that the same is also true for low-density data.

Next, a detailed description is made of background exclusion processing, a counterpart of line segment exclusion processing in the unnecessary line segment exclusion unit 50. FIGS. 13 and 14 illustrate concrete examples of exclusion by the background exclusion processing, and FIG. 15 is a flowchart showing an outline of an operation example of the background exclusion processing.

Figure 13A:
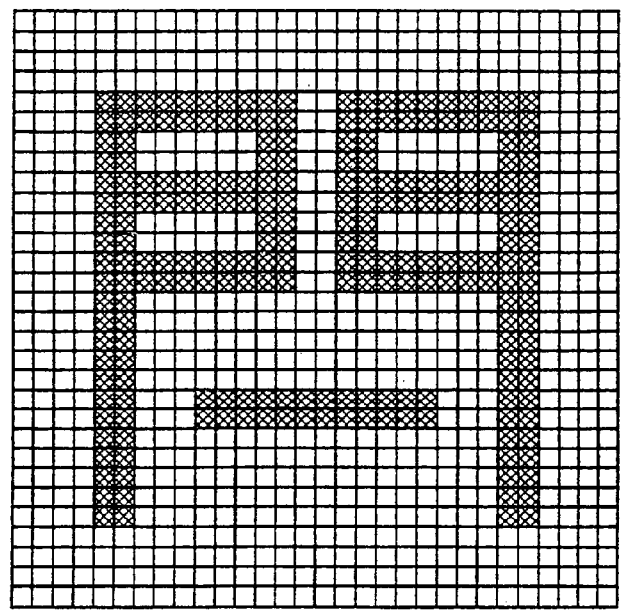
FIGS. 13A to 13C show examples of background exclusion processing performed by the unnecessary line segment exclusion unit in the image processing apparatus shown in FIG. 1, and FIG. 13A to FIG. 13C illustrate concrete examples of the respective states.

When line segments constituted of any pixel data of high-density data and low-density data stored in the image storage unit 20 are adjacent to each other within predetermined intervals, the background exclusion processing judges one of them as a background and excludes it. The background exclusion processing is described using FIG. 13. FIG. 13A shows a character "門" having a width of two pixels, produced by pixel data having density values of 200 to 220, in a background having pixel data having density values of 50 to 100. Line segments constituted of pixel data extracted as high-density data are shown in FIG,. 13B, and line segments constituted of pixel data extracted as low-density data are shown in FIG. 13C.

Figure 13B:
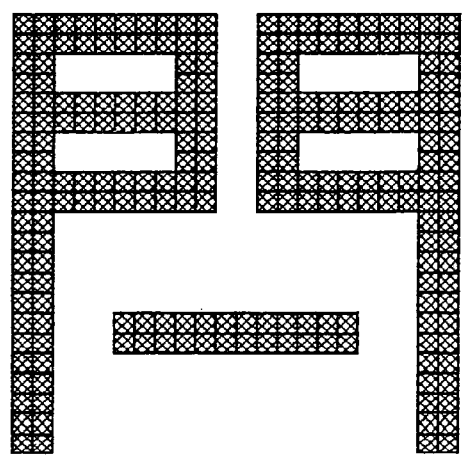
Figure 13C:
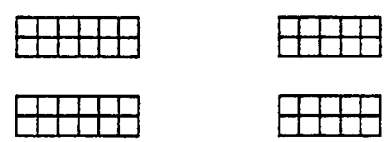
Figure 14A:
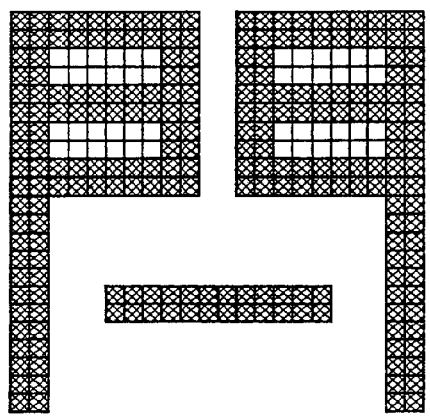
FIGS. 14A to 14D show another example of background exclusion processing performed by the unnecessary line segment exclusion unit in the image processing apparatus shown in FIG. 1, and FIG. 14A to FIG. 14D illustrate concrete examples of the respective states.
Figure 14B:
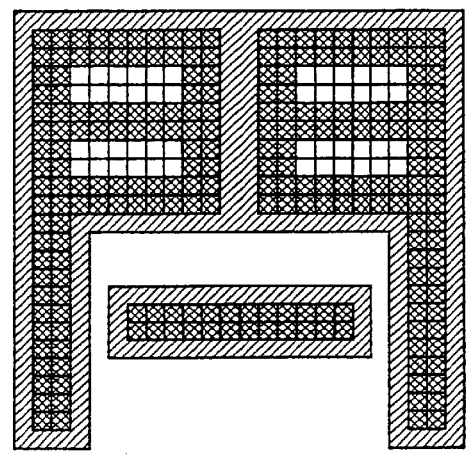

At this time, simply producing an ORed image from the line segments shown in FIG. 13B and the line segments shown in FIG. 13C would collapse the character "門" as shown in FIG. 14A. That is, the unnecessary line segment exclusion unit 50 must judge whether the line segments shown in FIG. 13B and the line segments shown in FIG. 13C are respectively to be extracted as line segments or excluded as backgrounds. The background exclusion processing makes the judgment and excludes line segment data corresponding to portions judged as backgrounds from the image storage unit 20.

Figure 15:
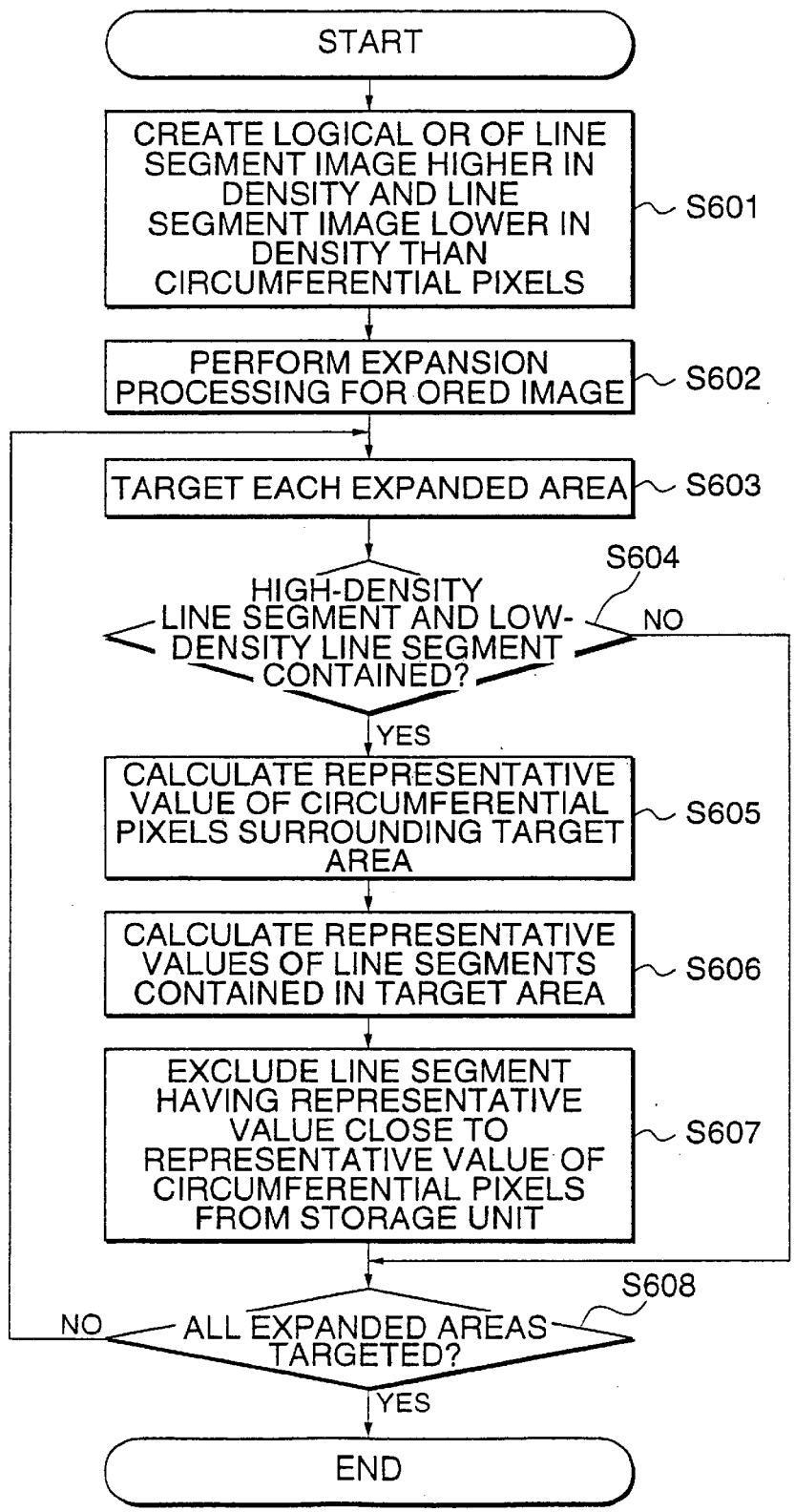
FIG. 15 is a flowchart showing an operation example of background exclusion processing performed by the unnecessary line segment exclusion unit in the image processing apparatus shown in FIG. 1.

The background exclusion processing is described using the flowchart of FIG. 15. To perform the background exclusion processing, the unnecessary line segment exclusion unit 50 first finds a logical OR of the high-density data and low-density data stored in the image storage unit 20. As a result, pixel data to constitute an ORed image as shown in FIG. 14A is obtained from, e.g., the high-density data and low-density data to constitute the line segments as shown in FIGS. 13B and 13C.

By the way, originally, both the line segments shown in FIGS. 13B and 13C was extracted because the character "門" exists in a manuscript image. Particularly, the character portion of "門" has the feature that both line segments exist in an extremely close distance. It will be appreciated that, in the example of FIG. 14A, the distance between both the line segments is 0.

When a line segment by high-density data and a line segment by low-density data exist in an extremely close distance as described above, the unnecessary line segment exclusion unit 50 judges that both line segments are line segments extracted from one object ("門" in the example of FIG. 13), and considers that processing to judge that either of them is a background is necessary.

Therefore, in FIG. 15, the unnecessary line segment exclusion unit 50 performs expansion processing for the ORed image obtained in a previous step (S601) (S602). It is to be noted here that each element is expanded by one pixel. Performing such expansion processing for the image shown in FIG. 14A results in the image shown in FIG. 14B being obtained.

When the expansion processing has been performed, the unnecessary line segment exclusion unit 50 notes each area resulting from the expansion processing (S603) . In the image shown in FIG. 14B, two areas are produced. It will be appreciated that the portion of "門" forms one area and the portion of "–" forms another area. The unnecessary line segment exclusion unit 50 judges whether a target area encompasses both line segments by high-density data and line segments by low-density (S604). As a result of the judgement, if both are encompassed, the unnecessary line segment exclusion unit 50 judges that both encompassed, that is, the line segments produced by high-density data and the line segments produced by low-density exist in an extremely close distance. It goes without saying that an extremely close distance here can be defined arbitrarily defined by the number of pixels to be expanded during expansion processing.

Figure 14C:
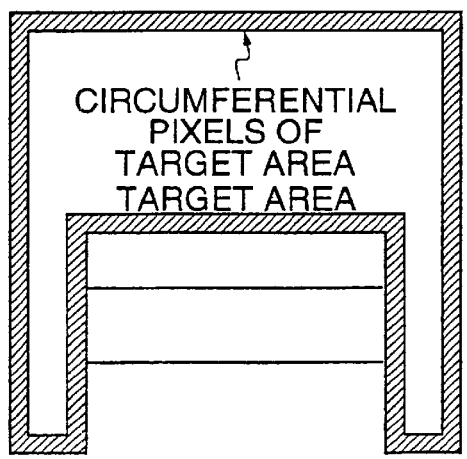

After judging that the both, described above, are encompassed within the target area, the unnecessary line segment exclusion unit 50 calculates a representative value from the densities of the pixel data of pixels surrounding the circumference of the target area (S605). It is to be noted here that the average of the density values of pieces of pixel data is used as the representative value. As the image data referenced at this time, data stored in the image storage unit 20 is used. For the image shown in FIG. 14A, circumferential pixels whose density values are referenced are as shown in FIG. 14C.

Also for each line segment encompassed in the target area, the unnecessary line segment exclusion unit 50 calculates a representative value from its density (S606). The average of density values is used as the representative value. Since the representative value is calculated separately for line segments by high-density data and line segments by low-density data, the unnecessary line segment exclusion unit 50 obtains two representative values.

The unnecessary line segment exclusion unit 50 compares two representative values (hereinafter respectively referred to as a first value and a second value) encompassed in the target area, and the representative value (hereinafter referred to as a third value) of circumferential pixels of the target area. As a result of the comparison, if the difference between the second value and the third value is greater than the difference between the first value and the third value, the unnecessary line segment exclusion unit 50 judges that the line segment by high-density data relating to the first value is a background, and excludes the high-density data within the target area from the line segment data stored in the image storage unit 20. Likewise, when the difference between the first value and the third value is greater than the difference between the second value and the third value, if a line segment having a representative value close to the representative value of circumferential pixels of the target area is a line segment lower in density than the circumferential pixels thereof, the unnecessary line segment exclusion unit 50 judges that the line segment by high-density data relating to the second value is a background, and excludes the low-density data within the target area from the line segment data stored in the image storage unit 20 (S607)

Thereafter, the unnecessary line segment exclusion unit 50 judges whether processing of the previous step (S604) has been performed for all areas produced by the expansion processing (S608), in which case the unnecessary line segment exclusion processing is completed.

Figure 14D:
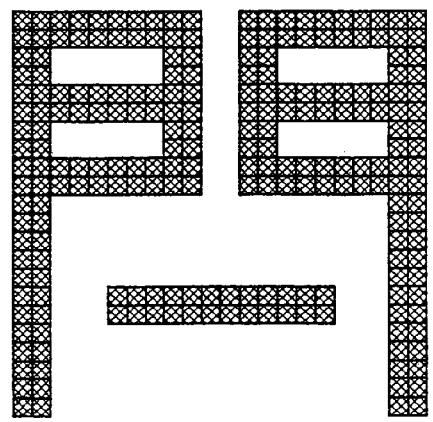

As a result of the above-described image processing, in the image storage unit 20 is stored line segment data corresponding to two line segment images, which are an image represented by high-density data and an image represented by low-density data. At this time, however, by creating a logical OR of the high-density data and the low-density data, line segment data corresponding to one line segment image may be stored as an image processing result. FIG. 14D shows the result of a series of image operations on the manuscript image shown in FIG. 13A.

Although a description has been made here of the example that a target image contains one character, by performing background processing, line segments constituting characters as shown in FIG. 16B can be automatically extracted from an image in which reversed characters exist, or images in which the background densities of characters differ partially within an identical manuscript image, for example, as shown in FIG. 16A.

As has been described above, in an image processing apparatus of the present embodiment or an image processing method performed by the image processing apparatus, according to an aspect of the present invention, since line segment data is extracted from input data by scanning the input data by line segment basic elements, for example, even if the densities of pixel data corresponding to backgrounds are not uniform, by judging the line segment basic elements as one unit, line segment data of a line segment width to be extracted can be extracted free of the influence of the densities being not uniform. Also, even if both high-density data and low-density data are contained, likewise, by judging line segment basic elements as one unit, they can be correctly extracted.

Therefore, based on line segment data extracted by the image processing apparatus or method of the present embodiment, only line segments such as characters and ruled lines having a desired line segment width can be extracted from not only binary images but also multi-valued images not uniform in background. Whether a line segment to be extracted is higher or lower in density than circumferential pixels thereof, or both coexist in one manuscript image, the line segments can be correctly extracted. Thereby, individual characters of normal character strings not qualified but also character strings reversely qualified can be automatically extracted, and further, line segments such as characters and ruled lines having different sizes in multi-valued images can be extracted.

That is, since the image processing apparatus or method of the present embodiment allows the application of many well-known techniques including character recognition to various images which have been difficult to process with conventional technologies, the present invention provides an important technology to widen the techniques.

Particularly, in the image processing apparatus or method of the present embodiment, according to another aspect of the present invention, in extracting line segment data, the line segment candidate extraction unit 44 performs line segment detection processing, based on the result of comparing the density values of pixel data included in at least two end areas within a line segment basic element and a predetermined threshold value TH1, whereby pixel data the line segment basic element matches is detected as eligible line segment data. Therefore, according to the image processing apparatus or method, by changing the shape and size of the line segment basic element or reducing or expanding input data to be scanned, line segments of any line width can be flexibly accommodated and correctly detected.

In the image processing apparatus or method of the present embodiment, according to another aspect of the present invention, either of a line width stored in the extraction line width storage unit and a line segment width specified in the extraction line width specification unit is decided as the line segment width of line segment data to be extracted. Accordingly, if the line segment width stored in the extraction line width storage part is selected, quick processing is enabled without placing no load on a user, while if the line segment width specified in the extraction line width specification unit is selected, the user can extract line segment data of any desired line segment width.

In the image processing apparatus or method of the present embodiment, according to another aspect of the present invention, since the line segment basic element formation unit 43 decides the shapes and sizes of the line segment basic elements according to the line segment width of line segment data to be extracted, for example, even if any line segment width of line segment data to be extracted is set, the line segment data can be correctly extracted.

In the image processing apparatus or method of the present embodiment, according to another aspect of the present invention, by judging whether both high-density data and low-density data are extracted or only either of them is extracted, it is conceivable to extract line segment data according to the judgement result. By doing so, for example, in processing for a binary image without reverse qualification, by extracting only either of high-density data and low-density data, quick processing can be achieved.

In the image processing apparatus or method of the present embodiment, according to another aspect of the present invention, in extracting line segment data, after a line segment candidate area has been determined by line segment candidate processing, pixel data to be extracted as line segment data is decided from the line segment candidate area. Therefore, according to the image processing apparatus or method, even for a line segment having an intersection, it becomes impossible that pixel data constituting the line segment cannot be detected, with the result that the accuracy of line segment data extraction can be increased.

In the image processing apparatus or method of the present embodiment, according to another aspect of the present invention, since the number of pixels to be expanded in determining a line segment candidate area and the size of a circumferential area in deciding pixel data to be extracted as line segment data are decided in accordance with the line segment width of line segment data to be extracted, line segments of any line width can be flexibly accommodated with increased extraction accuracy.

In the image processing apparatus or method of the present embodiment, according to another aspect of the present invention, since line segment exclusion processing is performed for extracted line segment data, data that could exert a bad influence on subsequent character recognition processing or the like is excluded by the line segment exclusion processing, with the result that the accuracy of line segment data extraction can be increased.

In the image processing apparatus or method of the present embodiment, according to another aspect of the present invention, after background exclusion processing is performed for extracted line segment data, if high-density data and low-density data coexist within a target area, either of them is judged as a background and excluded. Therefore, based on line segment data extracted by the image processing apparatus or method of the present embodiment, line segments to constitute characters can be extracted without fail and accurately from an image in which characters reversely qualified exist or images in which the background densities of characters differ partially within an identical manuscript image.

Although, in the present embodiment, a description has been made of a case where, in excluding either of high-density data and low-density data, if they are adjacent to each other, either of them is judged as a background, the present invention is not limited to this. For example, according to another aspect of the present invention, it is judged that high-density data and low-density data are in an inclusion relation, in which case either of them is judged as a background, based on the respective geometrical features, and background exclusion processing may be performed. In this case, whether there is an inclusion relation between them, that is, which of the high-density data and the low-density data is arranged to enclose another may be judged based on their respective coordinate values and the like. If there is an inclusion relation, which of them is to be used as a background can be easily and correctly judged based on geometrical features such as the aspect ratio of a rectangle formed by the high-density data or low-density data.

In other words, another aspect of the present invention, after extracting both high-density data and low-density data as line segment data, if both of them are included in a predetermined target area, by selecting only either of them as a line segment data extraction result, line segments to constitute characters can be extracted without fail and accurately from an image in which characters reversely qualified exist or images in which the background densities of characters differ partially within an identical manuscript image. It goes without saying that this method is applicable not only to high-density data and low-density data extracted using line segment basic elements, as described in the present embodiment, but also to data extracted by other techniques.

Second Embodiment

Next, a description is made of a second embodiment of the image processing apparatus and method according to the present invention. Here, only differences with the first embodiment described above are described. The image processing apparatus of the present embodiment is different in the line segment extraction unit 40 from that of the first embodiment.

Figure 17:
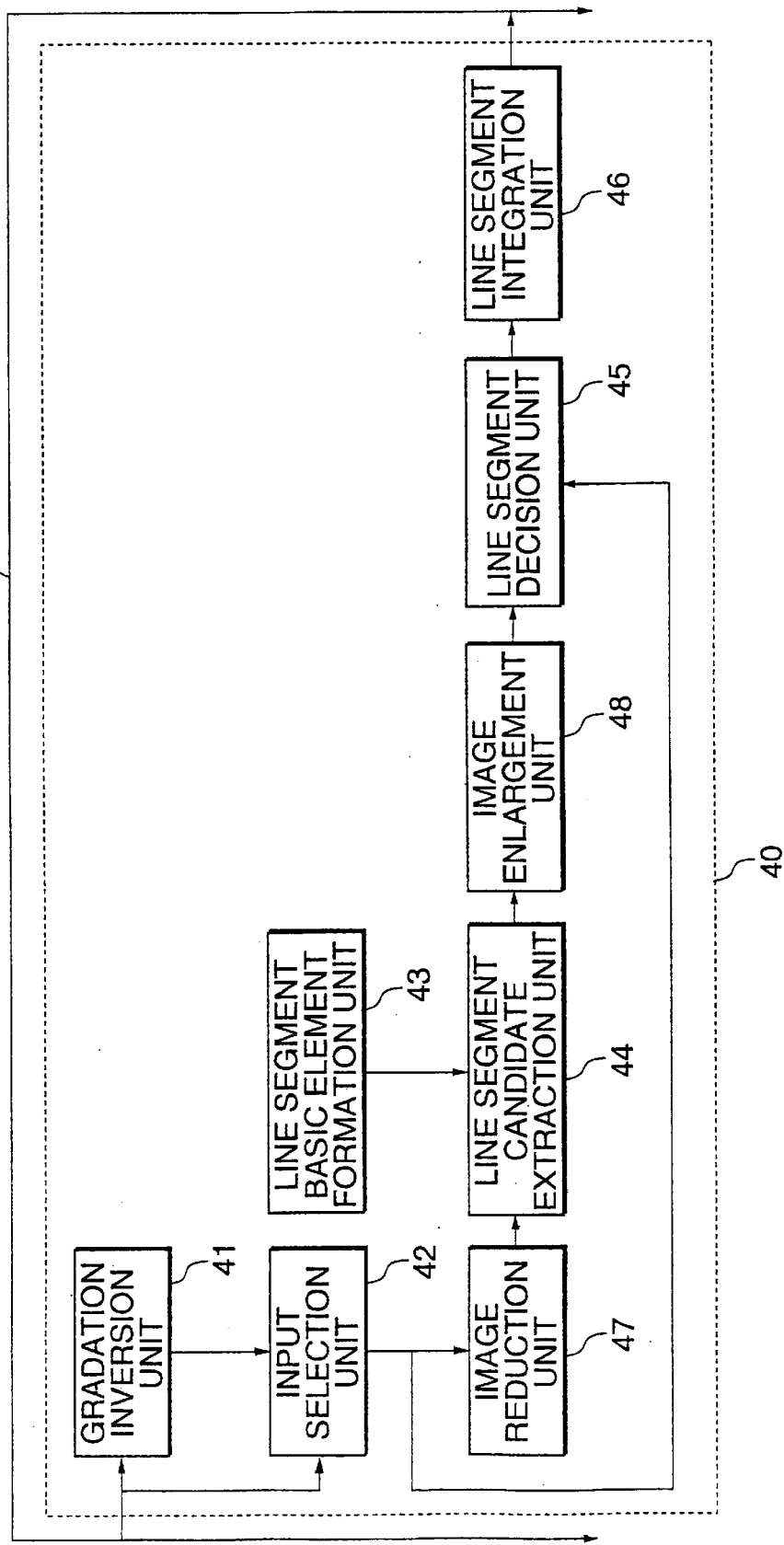
FIG. 17 is a block diagram showing an outline of the configuration of the line segment extraction unit in a second embodiment of the image processing apparatus of the present invention.

FIG. 17 is a block diagram showing an outline of the configuration of the line segment extraction unit 40 in the present embodiment. Components in the drawing that are identical to the components in the first embodiment are identified by the same reference numbers.

As shown in the drawing, the line segment extraction unit 40 of the present embodiment has an image reduction unit 47 and an image enlargement unit 48, in addition to the components of the first embodiment.

The image reduction unit 47 performs image reduction processing for image data selected as input data by the input selection unit 42, and sends pixel data having been subjected to the image reduction processing to the line segment candidate extraction unit 44. The image reduction processing may be performed using a well-known technique such as, e.g., conversion of the resolution of the input data.

The image enlargement unit 48 performs image enlargement processing for pixel data extracted by the line segment candidate extraction unit 44 and sends the pixel data having been subjected to the image enlargement processing to the line segment decision unit 45. The image enlargement processing may also be performed using a well-known technique such as conversion of the resolution of input data.

Figure 18:
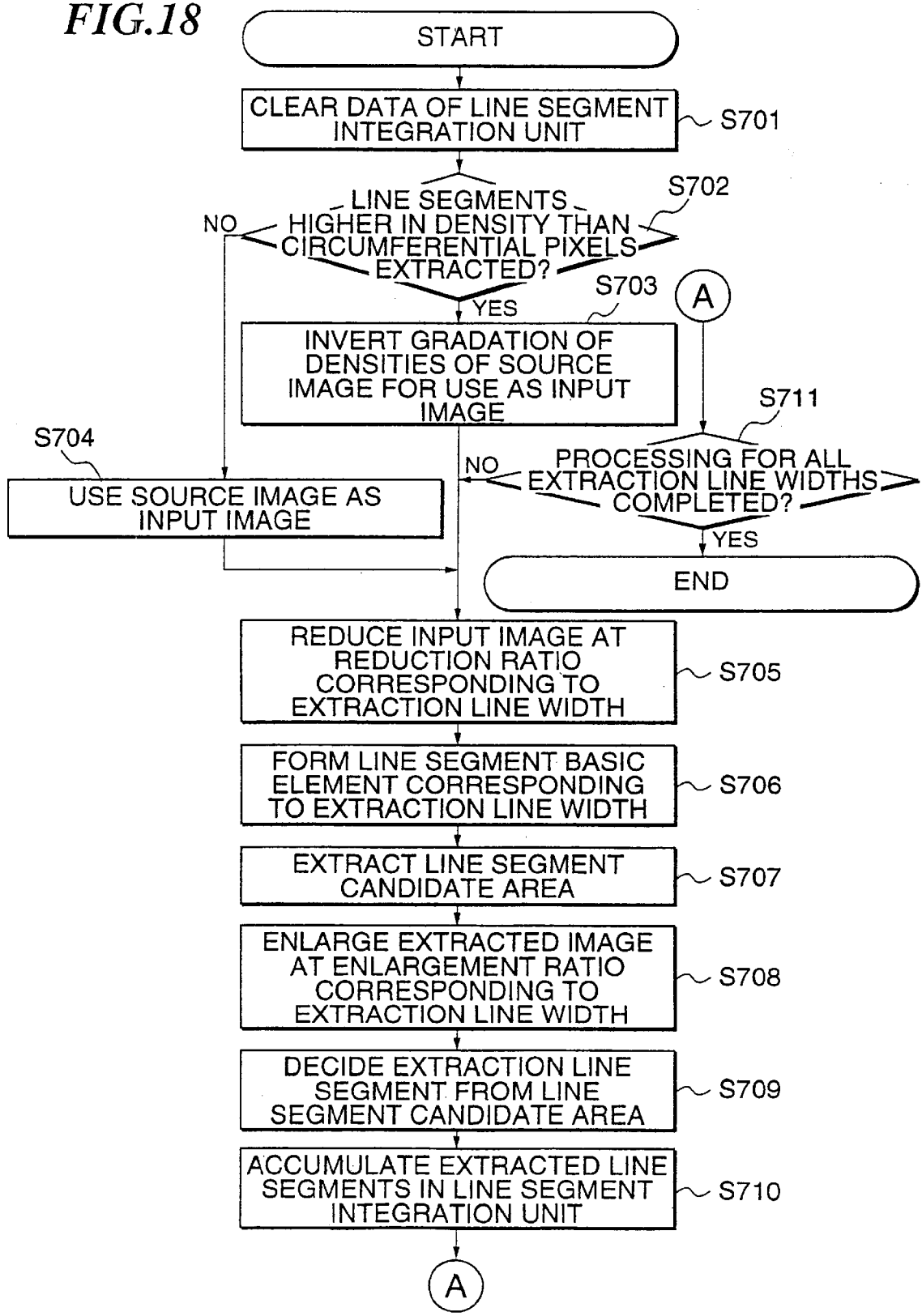
FIG. 18 is a flowchart showing an example of the processing operations of the overall line segment extraction unit in FIG. 17.

Here, a detailed description is made of the processing operations of the line segment extraction unit 40 thus configured. FIG. 18 is a flowchart showing an outline of an example of the processing operations of the overall line segment extraction unit 40.

As in the first embodiment, also in the line segment extraction unit 40 of the present embodiment, after clearing data of the line segment integration unit 46 (S701), the input selection unit 42 judges whether high-density data or low-density data is extracted (S702); if high-density data is extracted, outputs, as input data, image data whose density gradation is inverted by the gradation inversion part (S703); and if low-density data is extracted, outputs, without modification, image data acquired from the image storage unit 20 as input data (S704).

Thereafter, in the line segment extraction unit 40, the image reduction unit 47 performs image reduction processing for the input data selected by the input selection unit 42 and outputs data having been subjected to the image reduction processing as new input data (S705). A reduction ratio at this time may be decided in accordance with extraction line width information passed from the extraction line width decision unit 30. Accordingly, if an extraction line width decided in the extraction line width decision unit 30 extends to a wide range, a different reduction ratio is generated for each extraction line width.

After new input data has been generated by the image reduction processing, as in the first embodiment, in the line segment extraction unit 40, the line segment basic element formation unit 43 forms a line segment basic element (S706). At this time, even if the extraction line width decided by the extraction line width decision unit 30 extends to a wide range, since the image reduction unit 47 performs image reduction processing at a different reduction ratio for each extraction line width, the line segment basic element formation unit 43 may change the size of the line segment basic element during each execution or may form only line segment basic element and keep it unchanged. This may be decided from the trade-off for a reduction ratio of the image reduction processing by the image reduction unit 47.

Using the line segment basic element, the line segment candidate extraction unit 44 determines a line segment candidate area from new input data generated by the image reduction unit 47 (S707). At this time, although the line segment candidate extraction unit 44 determines a line segment candidate area by line segment detection processing and line segment candidate extraction processing as in the first embodiment, since this series of processing is performed for new input data, that is, input data having been subjected to the image reduction processing, they can be substantially sped up, compared with the embodiment described previously.

After the line segment candidate extraction unit 44 has determined a line segment candidate area, the image enlargement unit 48 performs image enlargement processing for pixel data included in the determined line segment candidate area (S708). It is to be noted that an enlargement ratio at this time corresponds to the reduction ratio of the image reduction processing having been performed previously by the image reduction unit 47. Therefore, the image enlargement unit 48 performing the image enlargement processing produces an image (pixel data) of the size that was before the image reduction processing by the image reduction unit 47.

Thereafter, in the line segment extraction unit 40, from the line segment candidate area after the image reduction processing by the image reduction unit 47, the line segment decision unit 45 decides pixel data to be extracted as line segment data as in the first embodiment (S709), and if line segment data is already stored in the image storage unit 20, the line segment integration unit 46 finds a logical OR of them to integrate the line segment data (S710). The line segment extraction unit 40 compares the extraction line width information passed from the extraction line width decision unit 30 with the line width having already been subjected to line segment extraction processing; judges whether processing has terminated for all extraction line widths (S711); and if there is a line width for which extraction is not yet completed, goes again to the step (S705), where the image reduction processing is performed. At this time, where execution of processing following the step (S705) corresponds to n-th time, it is to be noted that a reduction ratio in the image reduction processing is different from those having been used in the (n−1)-time executions. Upon completion of processing on all extraction line widths, the line segment extraction unit 40 terminates the line segment extraction processing.

As has been described above, in the image processing apparatus of the present embodiment or the image processing method performed by the image processing apparatus, since line segment data is extracted in almost the same way as in the first embodiment described above, line segment data of a line segment width to be extracted can be correctly extracted free of the influence of backgrounds and the like.

Yet, in the image processing apparatus or method of the present embodiment, in addition to the case of the first embodiment, according to another aspect of the present invention, since the image reduction processing is performed for input data to be scanned before extracting line segment data, the resulting reduction in the amount of data to be processed significantly speeds up extraction of the line segment data.

In the image processing apparatus or method of the present embodiment, according to another aspect of the present invention, since a reduction ratio in the image reduction processing and an enlargement ratio in the subsequent image enlargement processing are decided according to the line segment width of line segment data to be extracted, for example, even if any line segment width of line segment data to be extracted is set, the line segment data can be correctly extracted. Moreover, even if the width of line segment to be extracted extends to a wide range, by setting a different reduction ratio and enlargement ratio for each line segment width, line segment data of each line segment width can be extracted with only line segment basic element.

Third Embodiment

Next, a third embodiment of the image processing apparatus and method according to the present invention is described. Also herein, only differences with the first or second embodiment are described.

Figure 19:
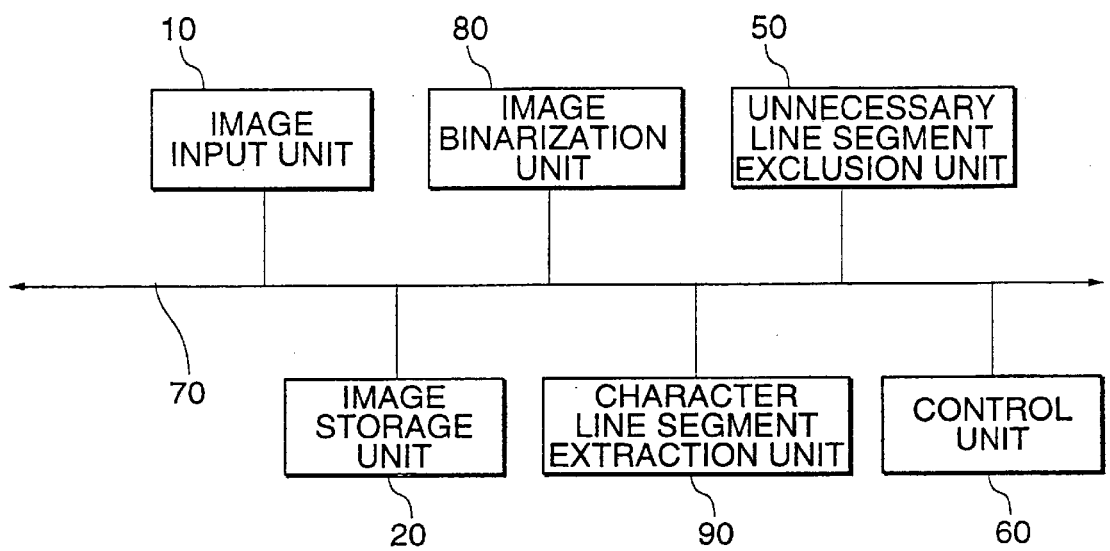
FIG. 19 is a block diagram showing an outline of the configuration of a third embodiment of the image processing apparatus of the present invention.

FIG. 19 is a block diagram showing an outline of the configuration of the image processing apparatus in the present embodiment. Components in the drawing that are identical to the components in the first embodiment are identified by the same reference numbers.

As shown in the drawing, the image processing apparatus of the present embodiment is similar to that of the first embodiment in that it has the image input unit 10, the image storage unit 20, the unnecessary line segment exclusion unit 50, the control unit 60, and the bus 70 as in the first embodiment, except that it is additionally provided with an image binarization unit 80 and a character line segment extraction unit 90.

The image binarization unit 80 performs binarization processing for image data acquired by the image input unit 10 and then stored in the image storage unit 20, and stores again the image data having been subjected to the binarization processing in the image storage unit 20 as binary image data.

The character line segment extraction unit 90 extracts data considered to constitute characters from the binary image data stored in the image storage unit 20. Data other than the pertinent line segment data is excluded as unnecessary data by the unnecessary line segment exclusion unit 50.

The image binarization unit 80 and the character line segment extraction unit 90 may be configured like software by, e.g., a microcomputer or the like executing a required program, or like hardware by electronic circuits or the like having required functions.

Figure 20:
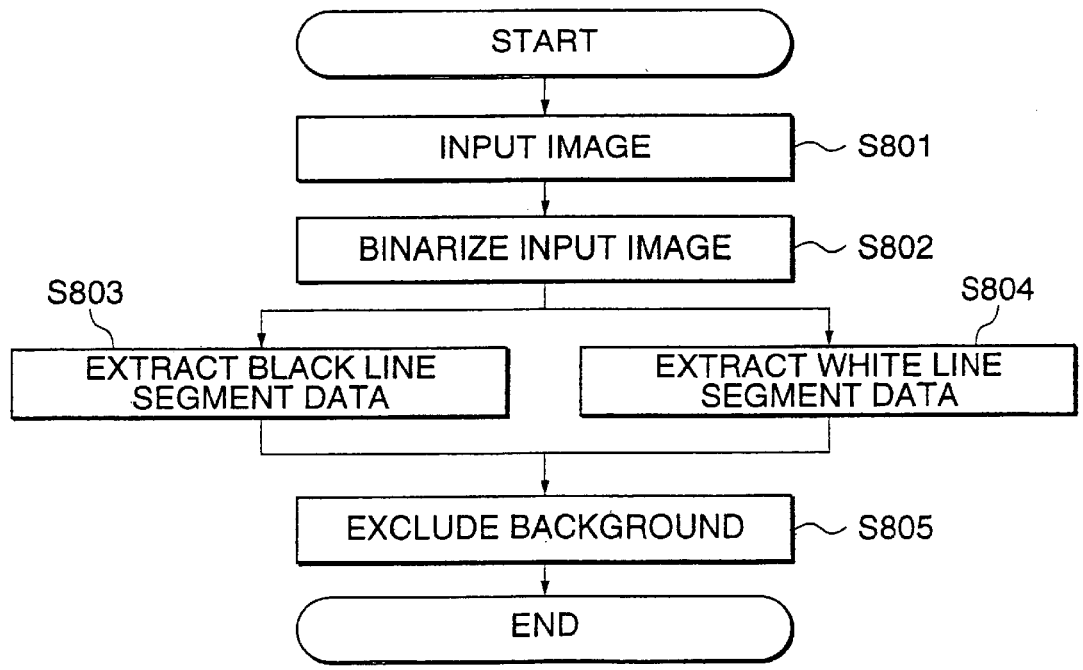
FIG. 20 is a flowchart showing an example of the processing operations of the overall image processing apparatus shown in FIG. 19.

Here, a description is made of an outline of the operations of the overall image processing apparatus configured as described above. FIG. 20 is a flowchart showing an outline of an example of the processing operations of the overall image processing apparatus.

As shown in the drawing, in the image processing apparatus, upon image input to the image input unit 10 (S801), after the image storage unit 20 stores image data acquired in the image input unit 10, the image binarization unit 80 fetches the image data from the image storage unit 20 and binarizes the image data to high-density components and low-density components (S802), and the image storage unit 20 stores the resulting binary image data again.

After the image storage unit 20 stores the binary image data, in the image processing apparatus, the character line segment extraction unit 90 extracts black line segment data and white line segment data (S803, S804). The black line segment data refers to line segment data considered to constitute characters, of pixel data classified as high density as a result of the binarization in the image binarization unit 80. The white line segment data refers to line segment data considered to constitute characters, of pixel data classified as low density as a result of the binarization in the image binarization unit 80.

Exclusion of the black line segment data and extraction of white line segment data may be performed in parallel with each other, or may be sequentially performed. When they are extracted, other unnecessary data is excluded by the unnecessary line segment exclusion unit 50.

Thereafter, in the image processing apparatus, the image storage unit 20 stores the black line segment data and white line segment data extracted by the character line segment extraction unit 90. At this time, if the black line segment data and white line segment data are adjacent at predetermined intervals, the unnecessary line segment exclusion unit 50 judges either of the line segment data as corresponding to a background, excludes the line segment data (S805), and regards the line segment data after the exclusion as the final result of extracting line segment data. The line segment data thus extracted is used as input data for performing character recognition and the like.

Hereinafter, differences with the first embodiment described above are described in detail.

Figure 21:
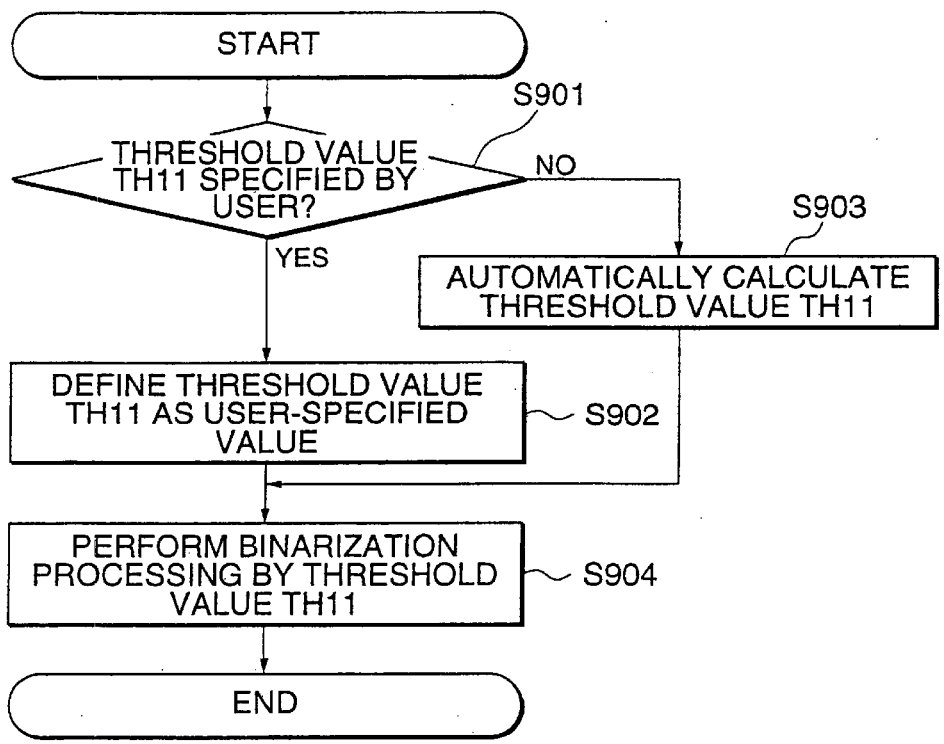
FIG. 21 is a flowchart showing an example of the processing operations of an image binarization unit in the image processing apparatus shown in FIG. 19.

First, a detailed description is made of the processing operations (S802 in FIG. 20) of the image binarization unit 80, of the above-described processing operations. FIG. 21 is a flowchart showing an outline of an example of the processing operations of the image binarization unit 80.

As shown in the drawing, to perform binarization processing, the image binarization unit 80 judges whether a binarization threshold value is specified by a user (S901). If a binarization threshold value is specified, the image binarization unit 80 sets the specified threshold value as a threshold value TH11 (S902). If not specified, the image binarization unit 80 calculates a threshold value optimum to a binarize image data acquired by the image input unit 10 and then stored in the image storage unit 20 and sets the calculated threshold value as the threshold value TH11 (S903). Here, a detailed description is omitted of a technique of calculating the threshold value, which may be calculated using a generally used well-known one.

After setting the threshold value TH11, the image binarization unit 80 binarizes the image data stored in the image storage unit 20, using the set threshold value TH11 (S904). Specifically, the density value of each pixel of the image data is compared with the threshold value TH11. If the density value of the compared pixel is equal to or higher than the threshold value TH11, a binarization result in the pixel is set to "1." On the contrary, if the density value of the pixel is lower than the threshold value TH11, a binarization result in the pixel is set to "0."

In this way, the image binarization unit 80 creates binary image data and stores it in the image storage unit 20.

Even if the image data in the image storage unit 20 has already been binarized, by performing binarization processing with a threshold value properly set as described above, the same image data as it was before the binarization processing can be obtained as binarization results.

Figure 22:
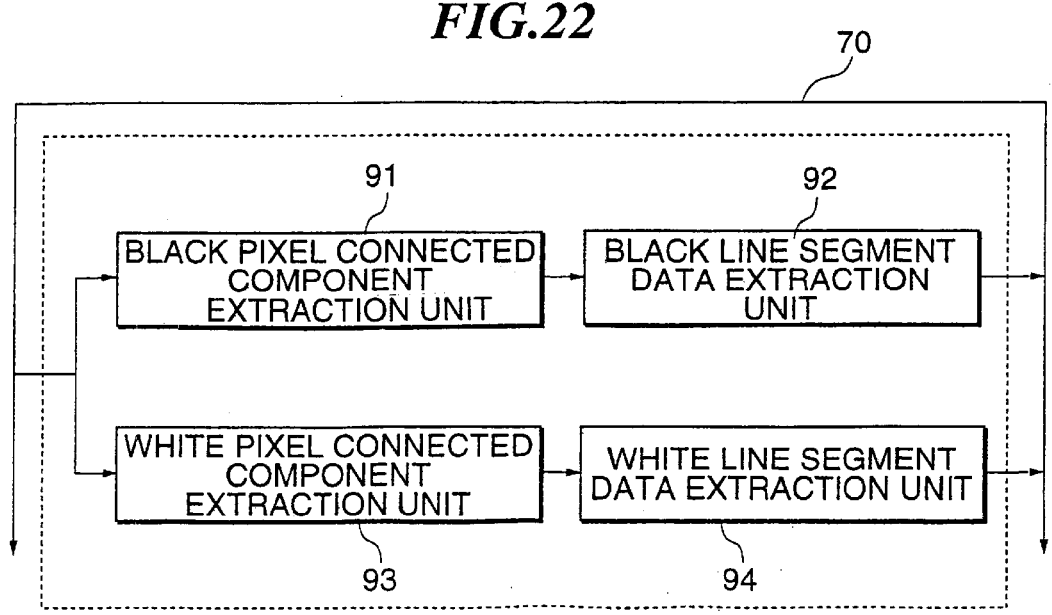
FIG. 22 is a block diagram showing the configuration of a character line segment extraction unit in the image processing apparatus shown in FIG. 19.

Next, a detailed description is made of the character line segment extraction unit 90 that extracts line segment data using the binarization results in the image binarization unit 80. First, a detailed configuration of the character line segment extraction unit 90 is described. FIG. 22 is a block diagram showing an outline of the configuration of the character line segment extraction unit 90.

As shown in the drawing, the character line segment extraction unit 90 has a black pixel connected component extraction unit 91, a black line segment data extraction unit 92, a white pixel connected component extraction unit 93, and a white line segment data extraction unit 94. These each are connected with the bus 70 that links the parts within the image processing apparatus.

The black pixel connected component extraction unit 91 receives the binary image data stored in the image storage unit 20 via the bus 70 and extracts black pixel connected components from the binary image data. The black pixel connected components refer to connected components arranged so that pixels (hereinafter referred to as black pixels) having a binarization result of "1" are mutually linked. That is, if at least one black pixel exists in eight pixels placed in the circumference of a certain black pixel, these pixels correspond to a black pixel connected component.

The black line segment data extraction unit 92 extracts, as black line segment data, only components considered to constitute characters, of the black pixel connected components extracted by the black pixel connected component extraction unit 91. Specifically, the black line segment data extraction unit 92 judges, for all black pixel connected components extracted by the black pixel connected component extraction unit 91, whether the size of each of them is proper as an element to represent a character, excludes too large or small ones, and extracts only remaining black pixel connected components as black line segment data. As a result of the extraction, black line segment data and other data are stored in the image storage unit 20, as "1" and "0", respectively.

The white pixel connected component extraction unit 93 extracts white pixel connected components from the binary image data within the image storage unit 20 in nearly the same way as in the black pixel connected component extraction unit 91. The white pixel connected components refer to connected components in which pixels (hereinafter referred to as white pixels) having a binarization result of "I" are mutually linked.

The white line segment data extraction unit 94 operates similarly to the black line segment data extraction unit 92, in that it extracts, as white line segment data, only components considered to constitute characters, of the white pixel connected components extracted by the white pixel connected component extraction unit 93. As a result of the extraction, white line segment data and other data are stored in the image storage unit 20, as "1" and "0", respectively.

Figure 23:
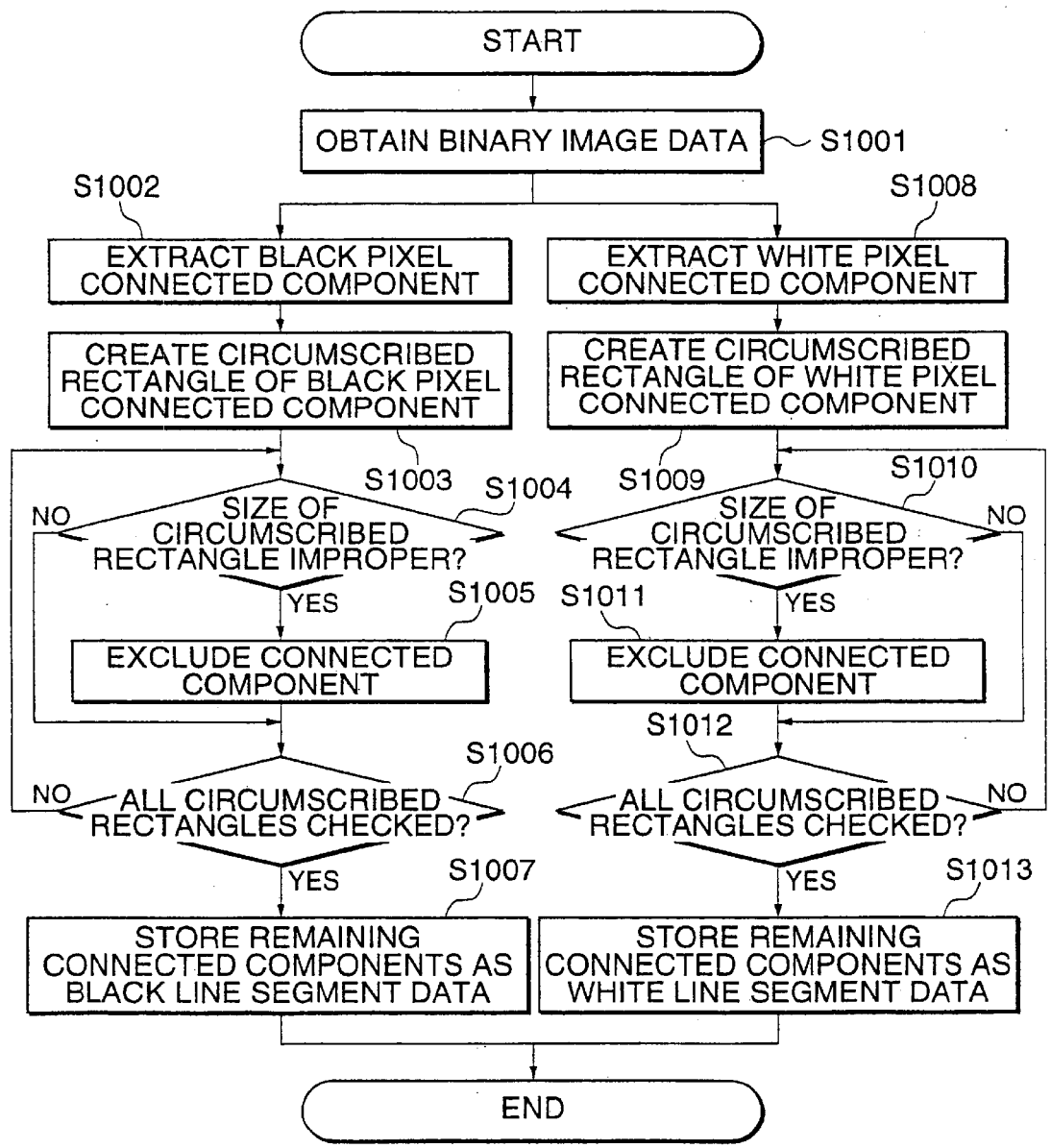
FIG. 23 is a flowchart showing an example of the processing operations of the overall character line segment extraction unit shown in FIG. 22.

Next, a detailed description is made of the processing operations (S803 and S804 in FIG. 20) in the character line segment extraction unit 90. FIG. 23 is a flowchart showing an outline of an example of the processing operations of the overall character line segment extraction unit 90.

As shown in the drawing, the character line segment extraction unit 90 acquires the binary image data having been binarized by the image binarization unit 80 from the image storage unit 20 (S1001) The character line segment extraction unit 90 uses the acquired binary image data to extract black line segment data (S1002 to S1007) and white line segment data (S1008 to S1013).

Black line segment data is extracted as described below. First, the black pixel connected component extraction unit 91 extracts black pixel connected components from the acquired binary image data (S1002). Thereafter, the black line segment data extraction unit 92 forms a circumscribed rectangle of each black pixel connected component (S1003) and judges whether the size of the created circumscribed rectangle is improper as an element to represent a character (S1004).

Figure 24:
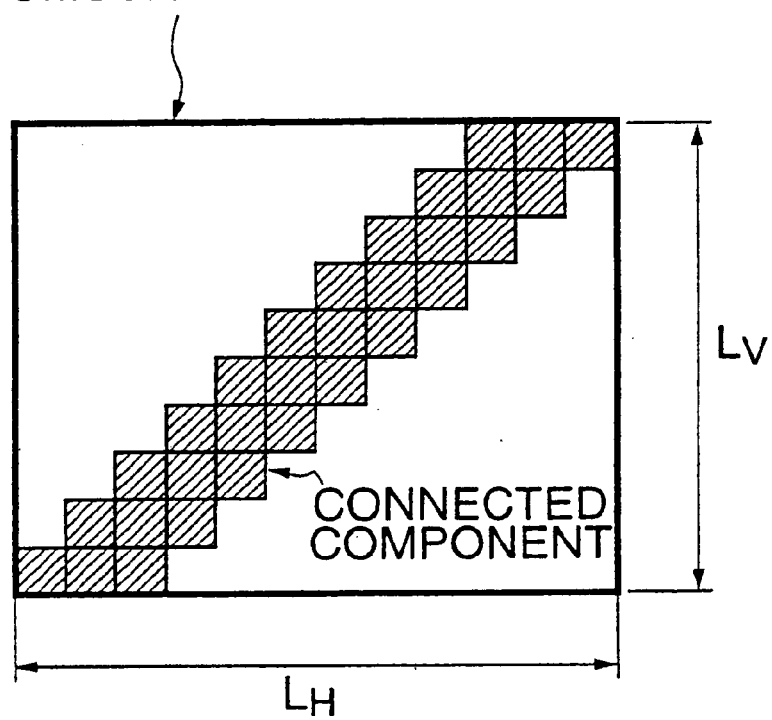
FIG. 24 illustrates a concrete example of a circumscribed rectangle of a connected component created by the character line segment extraction unit shown in FIG. 22.

Here, to provide a deeper understanding, a more detailed description is made using FIG. 24. FIG. 24 illustrates a relationship between a black pixel connected component and a circumscribed rectangle.

As shown in the drawing, after the black pixel connected component extraction unit 91 extracts a black pixel connected component with plural black pixels mutually linked, the black line segment data extraction unit 92 creates a circumscribed rectangle for the black pixel connected component. It is to be noted that the circumscribed rectangle has a vertical side length of $L_V$ and a horizontal side length of $L_H$.

After creating the circumscribed rectangle, the black line segment data extraction unit 92 compares the vertical side length $L_V$ and horizontal side length $L_H$ of the circumscribed rectangle with the threshold value TH12 of the lower-limit size of a predetermined line segment candidate and the threshold value TH13 of the upper-limit size thereof. As a result of the comparison, if both the vertical size length $L_V$ and the horizontal side length $L_H$ are less than the threshold value TH12, the black line segment data extraction unit 92 judges that the black pixel connected component is too small as an element to represent a character. If either of the vertical side length $L_V$ and the horizontal side length $L_H$ exceeds the threshold value TH13, the black line segment data extraction unit 92 judges that the black pixel connected component constituting the circumscribed rectangle is too large as an element to represent a character.

As a result of the judgement, if the size of the circumscribed rectangle is improper as an element to represent a character, the black line segment data extraction unit 92 excludes the black pixel connected component constituting the circumscribed rectangle, as shown in FIG. 23 (S1005). Checking on such a circumscribed rectangle is performed for all created circumscribed rectangles (S1006). As a result, black pixel connected components not having been excluded are judged as black line segment data and stored in the image storage unit 20 as black line segment data having a value of "1"; other data is also stored therein as image data having a value of "0" (S1007).

A further description is made using a concrete example. For example, if a source image shown in FIG. 16A is assumed to be binary image data, black pixel connected components as shown in FIG. 25A are extracted. In FIG. 25A, portions indicated in black correspond to black pixel connected components. The black line segment data extraction unit 92 creates a circumscribed rectangle for such black pixel connected components, and black pixel connected components improper as an element to represent a character are excluded based on the horizontal side length $L_V$ and the horizontal side length $L_H$ thereof, so that black line segment data as shown in FIG. 25B is obtained. Although black pixel connected components encompassed with white characters (reversed characters), in addition to black characters, are contained in the black line segment data shown in FIG. 25B, they are excluded by background exclusion processing subsequently performed in the unnecessary line segment exclusion unit 50. Therefore, the existence of the black pixel connected components will exert no influence on the result of character recognition or the like.

Next, the extraction of white line segment data is also described. White line segment data is also extracted as is black line segment data. That is, as shown in FIG. 23, after the white pixel connected component extraction unit 93 extracts white pixel connected components from the acquired binary image data (S1008), the white line segment data extraction unit 94 creates a circumscribed rectangle of each white pixel connected component (S1009), and judges whether the size of the created circumscribed rectangle is improper as an element to represent a character (S1010).

As a result of the judgement, if the size of the created circumscribed rectangle is improper as an element to represent a character, the white line segment data extraction unit 94 excludes the white pixel connected component constituting the circumscribed rectangle (S1011). Checking on such a circumscribed rectangle is performed for all created circumscribed rectangles (S1012). As a result, white pixel connected components not having been excluded are judged as white line segment data and stored in the image storage unit 20 as white line segment data having a value of "1"; other data is also stored therein as image data having a value of "0" (S1007).

Figure 26A:
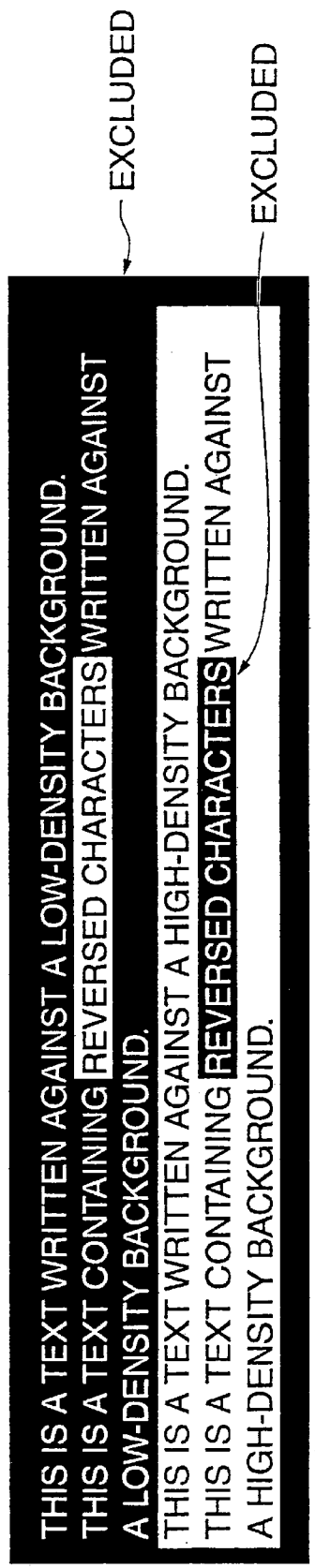
FIGS. 26A and 26B illustrate another example of image processing by the image processing apparatus shown in FIG. 19.
Figure 26B:
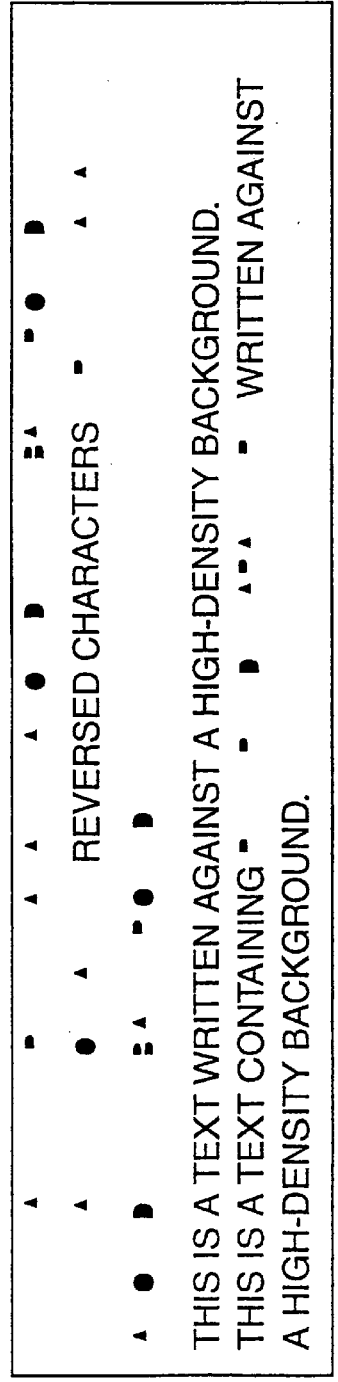

A further description is made using a concrete example. For example, if a source image shown in FIG. 16A is assumed to be binary image data, white pixel connected components as shown in FIG. 26A are extracted. In FIG. 26A, portions indicated in black correspond to white pixel connected components. The white line segment data extraction unit 94 creates a circumscribed rectangle for such white pixel connected components, and white pixel connected components improper as an element to represent a character are excluded based on the horizontal side length $L_V$ and the horizontal side length $L_H$ thereof, so that white line segment data as shown in FIG. 26B is obtained. Although white pixel connected components encompassed with black characters, in addition to white characters, are contained in the white line segment data shown in FIG. 26B, they are excluded by background exclusion processing subsequently performed in the unnecessary line segment exclusion unit 50. Therefore, the existence of the white pixel connected components will exert no influence on the result of character recognition or the like.

The configuration of the character line segment extraction unit 90 shown in FIG. 22 and the operation processing of the character line segment extraction unit 90 shown in FIG. 23 were described based on the premise that explicitly, black line segment data extraction processing and white line segment data extraction processing are performed independently from each other.

However, since the black line segment data extraction processing and the white line segment data extraction processing are different only in that attention is focused on black pixel connected portions or white pixel connected components of binary image data stored in the image storage unit 20, by simply inverting the value of each pixel during acquisition of the binary image data from the image storage unit 20, the black line segment data extraction processing can be used to extract white line segment data; to the contrary, the white line segment data extraction processing can be used to extract black line segment data. That is, if the control unit 60 directs the character line segment extraction unit 90 to invert the binary image data stored in the image storage unit 20 and acquire the inverted data, or acquire it without inverting it, the configuration of the character line segment extraction unit 90 shown in FIG. 22 can be simplified.

Next, a description is made of the processing operation (S805 in FIG. 20) of the unnecessary line segment exclusion unit 50 after the black line segment data and the white line segment data are extracted.

In the present embodiment, the unnecessary line segment exclusion unit 50 performs only the background exclusion processing described in the first embodiment. That is, for the line segment data and the white line segment data stored in the image storage unit 20, if pieces of line segment data constituted of any pixel data of both are adjacent to each other within a predetermined interval, the unnecessary line segment, exclusion unit 50 judges either of them as a background and excludes it. This will be described using a concrete example. The background exclusion processing is performed, for example, for the line segment data shown in FIG. 25B and the white line segment data shown in FIG. 26B, so that line segments constituting characters as shown in FIG. 16B are extracted. A description of detailed processing contents, which are the same as those in the first embodiment, is omitted here.

As has been described above, in the image processing apparatus of the present embodiment or the image processing method performed by the image processing apparatus, according to another aspect of the present invention, connected components are extracted based on the result of binarization processing and, from the connected components, only those considered to constitute characters are extracted as line segment data. Therefore, for a document image in advance known to have uniform density backgrounds, such as newsprint, reversely qualified characters and the like, if any, can be satisfactorily processed. That is, black characters and reversed characters, even if they coexist, can be extracted at the same time and correctly. Yet, use of a well-known binarization technique enables extraction by simple processing and further provides an opportunity to speed up the extraction processing.

In other words, the image processing apparatus or the image processing method of the present embodiment is used for document images having uniform density backgrounds more suitably than in the first embodiment, in terms of processing load and speed. It goes without saying that, in addition to document images having uniform density backgrounds, multi-valued images not uniform in background can be supported by setting appropriate threshold values during binarization processing of course, document images in advance binarized can also be supported.

In the image processing apparatus or the image processing method of the present embodiment, according to another aspect of the present invention, since it is judged based on the features of a circumscribed rectangle of a connected component whether the connected component included in the circumscribed rectangle constitutes a character, the judgement can be made easily and quickly. Moreover, only line segment data constituting a character can be correctly extracted.

As has been described above, according to the image processing apparatus or the image processing method of the present invention, since line segment data is extracted from input data by scanning the input data by line segment basic elements, for example, even if the densities of pixel data corresponding to backgrounds are not uniform, by judging the line segment basic elements as one unit, line segment data of a line segment width to be extracted can be extracted free of the influence of the densities being not uniform. Also, even if both line segment data higher in density than circumferential pixels thereof and line segment data lower in density than circumferential pixels thereof are contained, likewise, by judging a line segment basic element as one unit, they can be correctly extracted.

Therefore, based on line segment data extracted by the image processing apparatus or method, only line segments such as characters and ruled lines having a desired line segment width can be extracted from not only binary images but also multi-valued images not uniform in background. Whether a line segment to be extracted is higher or lower in density than circumferential pixels thereof, or both coexist in one manuscript image, the line segments can be correctly extracted. Thereby, individual characters of normal character strings not qualified but also character strings reversely qualified can be automatically extracted, and further, line segments such as characters and ruled lines having different sizes in multi-valued images can be extracted.

According to the image processing apparatus or the image processing method of the present invention, connected components are extracted from image data by binarizing the image data and, of the extracted connected components, only those judged as constituting characters are extracted as line segment data. Therefore, for example, even if reversely qualified characters or the like exist, line segment data constituting the characters can be correctly extracted by binarization.

Accordingly, based on line segment data extracted by the image processing apparatus or method, when reversely qualified characters or the like exist in document images having uniform density backgrounds, only line segments constituting the characters can be extracted correctly and quickly.

What is claimed is:

1. An image processing apparatus extracting line segment data from image data, comprising:

a data acquisition part that acquires image data having plural pieces of pixel data;

a line width decision part that determines the line segment width of line segment data to be extracted from the image data;

a line segment basic element decision part that determines a graphic shape of a line segment basic element according to the line segment width determined by the line width decision part;

a line segment extraction part that extracts line segment data having the line segment width determined by the line width decision part from the image data acquired by the data acquisition part by scanning the image data using the line segment basic element, wherein the line segment extraction part comprises:

a detection part that detects the density values of pixel data included in the line segment basic element by the scanning;

a calculation part that uses the density values detected by the detection part to calculate a representative value of densities of pixel data included in at least two end areas within the line segment basic element and the representative value of densities of pixel data included in an internal area other than the at least two end areas within the line segment basic element;

a judgement part that compares a difference between the representative value of the end areas and the representative value of the internal area calculated by the calculation part with a predetermined threshold value and judges whether the difference is greater than the threshold value; and an extraction part that extracts the pixel data included in the internal area if the judgement part judges that the difference is greater than the threshold value.

2. The image processing apparatus according to claim 1, further comprising:

a line width storage part that in advance stores a line segment width to be decided by the line width decision part.

3. The image processing apparatus according to claim 1, further comprising:
a line width specification part that specifies a line segment width to be decided by the line width decision part.

4. The image processing apparatus according to claim 1, wherein the size and shape of the line segment basic element is determined in accordance with a line segment width decided by the line width decision part.

5. The image processing apparatus according to claim 1, further comprising:
an extraction specification part that specifies to the line segment extraction part whether to extract line segment data higher in density than the circumference thereof and/or line segment data lower in density than the circumference thereof.

6. The image processing apparatus according to claim 1, wherein the line segment extraction part comprises:
a line segment candidate extraction part that specifies a line segment candidate area which includes a line segment of a line segment width decided by the line width decision part; and
a line segment detection part that binarizes pixel data included in the line segment candidate area specified by the line segment candidate extraction part, based on the density values of pixel data in a circumferential area thereof, and decides pixel data to be extracted as the line segment data from the pixel data included in the line segment candidate area.

7. The image processing apparatus according to claim 6, wherein the circumferential area is decided in accordance with a line segment width decided by the line width decision part.

8. The image processing apparatus according to claim 6, wherein the line segment candidate extraction part expands an area consisting of pixel data extracted by the scanning using the line segment basic element by a predetermined number of pixels to extract the expanded area as the line segment candidate area.

9. The image processing apparatus according to claim 8, wherein the number of pixels by which the area is to be expanded by the line segment candidate extraction part is decided in accordance with a line segment width decided by the line width decision part.

10. The image processing apparatus according to claim 1, further comprising:
a line segment exclusion part that, from the line segment data extracted by the line segment extraction part, excludes the data of a line segment constituted of the line segment data that is connected to a thicker or thinner line segment.

11. The image processing apparatus according to claim 1, wherein the line segment extraction part comprises a first line segment extraction part that extracts line segment data higher in density than the circumference thereof and a second line segment extraction part that extracts line segment data lower in density than the circumference thereof, the apparatus further comprising:
a selection part that selects, as a line segment data extraction result, only one of line segment data extracted by a first line segment extraction part and line segment data extracted by a second line segment extraction part if both of them are included in a predetermined target area.

12. The image processing apparatus according to claim 11, further comprising:
an adjacent judgement part that judges whether a line segment constituted of the line segment data extracted by the first line segment extraction part and a line segment constituted of the line segment data extracted by the second line segment extraction part are adjacent to each other,
wherein the selection part regards, as the target area, an area constituted by the line segments judged as adjacent to each other by the adjacent judgement part, and selects one of the pieces of line segment data included in the target area.

13. The image processing apparatus according to claim 11, further comprising:
a first representative value calculation part that calculates, as a first value, a representative value of densities of the line segment data extracted by the first line segment extraction part, of the line segment data included in the target area;
a second representative value calculation part that calculates, as a second value, a representative value of densities of the line segment data extracted by the second line segment extraction part, of the line segment data included in the target area; and
a third representative value calculation part that calculates, as a third value, a representative value of densities of circumferential pixel data of the target area,
wherein the selection part compares the first value and the second value respectively with the third value, and determines the line segment data having the representative value greater in the difference with the third value as the line segment data to be selected.

14. The image processing apparatus according to claim 11, further comprising:
an inclusion judgement part that judges whether there is an inclusion relationship within the target area between a line segment constituted of the line segment data extracted by the first line segment extraction part and a line segment constituted of the line segment data extracted by the second line segment extraction part,
wherein, if the inclusion judgement part judges that there is an inclusion relationship between them, the selection part decides the line segment data to be selected, based on geometric features of each line segment data included in the target area.

15. The image processing apparatus according to claim 1, further comprising:
an image reduction part that performs image reduction processing for the image data acquired by the data acquisition part before the line segment extraction part extracts line segment data; and
an image enlargement part that, after the line segment extraction part extracts line segment data from the image data having been subjected to the image reduction processing by the image reduction part, performs image enlargement processing for the extracted line segment data.

16. The image processing apparatus according to claim 15, wherein a reduction ratio in the image reduction processing performed by the image reduction part and an enlargement ratio in the image enlargement processing performed by the image enlargement part are decided in accordance with a line segment width decided by the line width decision part.

17. An image processing apparatus, comprising:
a data acquisition part that acquires image data having plural pieces of pixel data;
a line segment extraction part that, from the image data acquired by the data acquisition part, extracts high-density data constituting a line segment higher in density than the circumference thereof and low-density data constituting a line segment lower in density than the circumference thereof;

an adjacent judgement part that judges whether a line segment constituted of the high-density data and a line segment constituted of the low-density data are adjacent to each other; and a selection part that selects, as a line segment data extraction result, only one of the high-density data and low-density data extracted by the line segment extraction part when the line segments are judged as being adjacent to each other by the adjacent judgement part.

18. An image processing apparatus, comprising:

a data acquisition part that acquires image data consisting of plural pieces of pixel data;

a binarization part that binarizes the image data acquired by the data acquisition part to high-density components and low-density components;

a connected component extraction part that extracts both or one of a high-density connected component and a low-density connected component from the image data having been binarized by the binarization part, the high-density connected component having high-density components successively arranged, and the low-density connected component having low-density components successively arranged;

a line segment extraction part that, of the connected components extracted by the connected component extraction part, excludes those judged as not constituting a character, and extracts the remaining connected components as line segment data; and a selection part that, as a result of the extraction by the line segment extraction part, if both a high-density connected component and a low-density connected component are included in a predetermined target area, selects only one of them as a line segment data extraction result.

19. The image processing apparatus according to claim 18, wherein the line segment extraction part comprises:

a circumscribed rectangle creation part that creates a circumscribed rectangle of a connected component extracted by the connected component extraction part; and a character judgement part that judges whether the connected component included in the circumscribed rectangle constitutes a character, based on features of the circumscribed rectangle created by the circumscribed rectangle creation part.

20. An image processing method which, after acquiring image data having plural pieces of pixel data, extracts line segment data of a given width from the image data, the method comprising the steps of:

determining the line segment width of line segment data to be extracted from the image data;

determining a graphic shape of a line segment basic element according to the line segment width;

scanning the image data using the line segment basic element; and extracting line segment data having the line segment width from the image data by the scanning, wherein the step of extracting the line segment comprises the steps of:

detecting the density values of pixel data included in the line segment basic element by the scanning;

by using the detected density values, calculating the representative value of densities of pixel data included in at least two end areas within the line segment basic element and the representative value of densities of pixel data included in an internal area other than the at least two end areas within the line segment basic element, comparing a difference between the calculated representative value of the end areas and the representative value of the internal area with a predetermined threshold value and judging whether the difference is greater than the threshold value, and extracting the pixel data included in the internal area if it is judged that the difference is greater than the threshold value.

21. The image processing method according to claim 20, wherein, before performing the line segment data extraction, the line segment width of line segment data to be extracted is decided based on a line segment width stored in advance.

22. The image processing method according to claim 20, wherein, before performing the line segment data extraction, the line segment width of line segment data to be extracted is decided based on directions from the outside.

23. The image processing method according to claim 20, wherein, before performing the line segment data extraction, a size and shape of the line segment basic element are decided in accordance with the line segment width of line segment data to be extracted.

24. The image processing method according to claim 20, further comprising the step of:

deciding, before performing the line segment data extraction, whether to extract line segment data higher in density than the circumference thereof and/or line segment data lower in density than the circumference thereof.

25. The image processing method according to claim 20, wherein the step of extracting the line segment data comprises the steps of:

specifying a line segment candidate area which includes a line segment constituted of the line segment data to be extracted;

binarizing pixel data included in the specified line segment candidate area, based on the density values of pixel data in a circumferential area thereof, and deciding, based on the binarization result, pixel data to be extracted as the line segment data from the pixel data included in the line segment candidate area.

26. The image processing method according to claim 25, wherein the circumferential area is decided in accordance with the line segment width of line segment data to be extracted.

27. The image processing method according to claim 25, wherein, for extraction of the pixel data included in the line segment candidate area, an area consisting of pixel data extracted by the scanning using the line segment basic element is expanded by a predetermined number of pixels, and the expanded area is specified as the line segment candidate area.

28. The image processing method according to claim 27, wherein the number of pixels by which the area is to be expanded is decided in accordance with the line segment width of line segment data to be extracted.

29. The image processing method according to claim 20, further comprising the step of:

excluding, after performing the line segment data extraction, from the extracted line segment data, the data of a line segment constituted of the line segment data that is connected to a thicker or thinner line segment, and making the line segment data after the exclusion an extraction result.

30. The image processing method according to claim 20, wherein the step of extracting the line segment data comprises the step of:

selecting, as a line segment data extraction result, only one of line segment data extracted by first extraction and line segment data extracted by second extraction if both of them are included in a predetermined target area, wherein the first extraction is performed for line segment data higher in density than the circumference thereof and the second extraction is performed for line segment data lower in density than the circumference thereof.

31. The image processing method according to claim 30, wherein the step of selecting one of the line segment data extracted by the first extraction and the line segment data extracted by the second extraction comprises the steps of:

judging whether a line segment constituted of the line segment data extracted by the first line segment extraction and a line segment constituted of the line segment data extracted by the second line segment extraction are adjacent to each other; and regarding, if they are adjacent to each other, as the target area, an area constituted by the adjacent line segments and selecting one of the pieces off line segment data included in the target area.

32. The image processing method according to claim 30, wherein the step of selecting one of the line segment data extracted by the first extraction and the line segment data extracted by the second extraction comprises the steps of:

calculating, as a first value, a representative value of densities of the line segment data extracted by the first extraction, of the line segment data included in the target area;

calculating, as a second value, a representative value of densities of the line segment data extracted by the second extraction, of the line segment data included in the target area;

calculating, as a third value, a representative value of densities of circumferential pixel data of the target area; and comparing the first value and the second value respectively with the third value, and determining the line segment data having the representative value greater in the difference with the third value as the line segment data to be selected.

33. The image processing method according to claim 30, further comprising the steps of:

judging whether there is an inclusion relationship within the target area between a line segment constituted of the line segment data extracted by the first extraction and a line segment constituted of the line segment data extracted by the second extraction, and deciding, if there is the inclusion relationship between them, the line segment data to be selected, based on geometric features of line segment data included in the target area.

34. The image processing method according to claim 20, further comprising the steps of:

performing image reduction processing for the image data to be scanned using the line segment basic element before performing the line segment data extraction; and after extracting the line segment data from the image data having been subjected to the image reduction processing, performing image enlargement processing for the extracted line segment data.

35. The image processing method according to claim 34, wherein a reduction ratio in the image reduction processing and an enlargement ratio in the image enlargement processing are decided in accordance with the line segment width of line segment data to be extracted.

36. An image processing method for extracting, after acquiring image data having plural pieces of pixel data, line segment data from the image data, the method comprising the steps of:

extracting, from the image data, high-density data constituting a line segment higher in density than the circumference thereof and low-density data constituting a line segment lower in density than the circumference thereof;

judging whether a line segment constituted of the high-density data and a line segment constituted of the low-density data are adjacent to each other; and selecting, as a line segment data extraction result, only one of the high-density data and low-density data when the line segments are judged as being adjacent to each other by the judging step.

37. An image processing method for extracting, after acquiring image data consisting of plural pieces of pixel data, pixel data constituting a line segment from the image data as line segment data, the method comprising the steps of:

binarizing the image data to high-density components and low-density components;

extracting both or one of a high-density connected component and a low-density connected component from the binarized image data, the high-density connected component having high-density components successively arranged, and the low-density connected component having low-density components successively arranged;

excluding, of the extracted connected components, those judged as not constituting a character, and extracting the remaining connected components as line segment data; and as a result of the extraction, if both the high-density connected component and the low-density connected component are included in a predetermined target area, selecting only one of them as a line segment data extraction result.

38. The image processing method according to claim 37, wherein the step of judging whether the connected component constitutes a character comprises the steps of:

creating a circumscribed rectangle of the connected component; and making the judgement, based on features of the circumscribed rectangle.

39. A storage medium readable by a computer, storing a program of instructions executable by the computer to perform extracting, after acquiring image data having plural pieces of pixel data, of line segment data having a given width from the image data, the instructions comprising the steps of:

determining the line segment width of line segment data to be extracted from the image data;

determining a graphic shape of a line segment basic element according to the line segment width;

scanning the image data using the line segment basic element; and extracting line segment data having the line segment width from the image data by the scanning, wherein the step of extracting the line segment comprises the steps of:

detecting the density values of pixel data included in the line segment basic element by the scanning;

by using the detected density values, calculating the representative value of densities of pixel data included in at least two end areas within the line segment basic element and the representative value of densities of pixel data included in an internal area other than the at least two end areas within the line segment basic element;

comparing a difference between the calculated representative value of the end areas and the representative value of the internal area with a predetermined threshold value and judging whether the difference is greater than the threshold value; and extracting the pixel data included in the internal area if it is judged that the difference is greater than the threshold value.

40. A storage medium readable by a computer, storing a program of instructions executable by the computer to perform extracting, after acquiring image data having plural pieces of pixel data, of line segment data from the image data, the instructions comprising the steps of:

extracting, from the image data, high-density data constituting a line segment higher in density than the circumference thereof and low-density data constituting a line segment lower in density than the circumference thereof;

judging whether a line segment constituted of the high-density data and a line segment constituted of the low-density data are adjacent to each other; and selecting, as a line segment data extraction result, one of the high-density data and the low-density data when the line segments are judged as being adjacent to each other by the judging step.

41. A storage medium readable by a computer, storing a program of instructions executable by the computer to perform extracting, after acquiring image data consisting of plural pieces of pixel data, as line segment data, pixel data constituting a line segment from the image data, the instructions comprising the steps of:

binarizing the image data to high-density components and low-density components;

extracting both or one of the high-density connected component and the low-density connected component from the image data having been subjected to the binarization processing, the high-density connected component having high-density components successively arranged, and the low-density connected component having low-density components successively arranged;

excluding, of the extracted connected components, those judged as not constituting a character, and extracting the remaining connected components as line segment data; and as a result of the extraction, if both the high-density connected component and the low-density connected component are included in a predetermined target area, selecting only either of them as a line segment data extraction result.

42. An image processing method which, after acquiring image data having plural pieces of pixel data, extracts line segment data of a given width from the image data, the method comprising the steps of:

determining the line segment width of line segment data to be extracted from the image data;

determining a graphic shape of a line segment basic element according to the line segment width;

scanning the image data using the line segment basic element;

extracting line segment data having the line segment width from the image data by the scanning; and deciding, before performing the line segment data extraction, whether to extract line segment data higher in density than the circumference thereof and/or line segment data lower in density than the circumference thereof.

43. An image processing method which, after acquiring image data having plural pieces of pixel data, extracts line segment data of a given width from the image data, the method comprising the steps of:

determining the line segment width of line segment data to be extracted from the image data;

determining a graphic shape of a line segment basic element according to the line segment width;

scanning the image data using the line segment basic element; and extracting line segment data having the line segment width from the image data by the scanning, wherein the step of extracting the line segment data comprises the step of: selecting, as a line segment data extraction result, only one of line segment data extracted by first extraction and line segment data extracted by second extraction if both of them are included in a predetermined target area, wherein the first extraction is performed for line segment data higher in density than the circumference thereof and the second extraction is performed for line segment data lower in density than the circumference thereof.

44. The image processing method according to claim 43, wherein the step of selecting one of the line segment data extracted by the first extraction and the line segment data extracted by the second extraction comprises the steps of:

judging whether a line segment constituted of the line segment data extracted by the first line segment extraction and a line segment constituted of the line segment data extracted by the second line segment extraction are adjacent to each other; and regarding, if they are adjacent to each other, as the target area, an area constituted by the adjacent line segments and selecting one of the pieces of line segment data included in the target area.

45. The image processing method according to claim 43, wherein the step of selecting one of the line segment data extracted by the first extraction and the line segment data extracted by the second extraction comprises the steps of:

calculating, as a first value, a representative value of densities of the line segment data extracted by the first extraction, of the line segment data included in the target area;

calculating, as a second value, a representative value of densities of the line segment data extracted by the second extraction, of the line segment data included in the target area;

calculating, as a third value, a representative value of densities of circumferential pixel data of the target area; and comparing the first value and the second value respectively with the third value, and determining the line segment data having the representative value greater in the difference with the third value as the line segment data to be selected.

46. The image processing method according to claim 43, further comprising the steps of:

judging whether there is an inclusion relationship within the target area between a line segment constituted of the line segment data extracted by the first extraction and a line segment constituted of the line segment data extracted by the second extraction, and deciding, if there is the inclusion relationship between them, the line segment data to be selected, based on geometric features of line segment data included in the target area.

47. An image processing method which, after acquiring image data having plural pieces of pixel data, extracts line segment data of a given width from the image data, the method comprising the steps of:

determining the line segment width of line segment data to be extracted from the image data;

determining a graphic shape of a line segment basic element according to the line segment width;

scanning the image data using the line segment basic element;

extracting line segment data having the line segment width from the image data by the scanning;

performing image reduction processing for the image data to be scanned using the line segment basic element before performing the line segment data extraction; and after extracting the line segment data from the image data having been subjected to the image reduction processing, performing image enlargement processing for the extracted line segment data.

48. The image processing method according to claim 47, wherein a reduction ratio in the image reduction processing and an enlargement ratio in the image enlargement processing are decided in accordance with the line segment width of line segment data to be extracted.

* * * * *